United States Patent
Fritsch et al.

[11] Patent Number: 6,028,751
[45] Date of Patent: Feb. 22, 2000

[54] CLEANING DEVICE FOR CLEANING COMPONENTS OF A VIDEO UNIT AND FOR CLEANING OUTSIDE A TAPE PATH AREA

[76] Inventors: Joseph Frederick Fritsch; Roxanne Yvonne Fritsch, both of 114 Lansdowne Park, Ballsbridge, Dublin 4, Ireland

[21] Appl. No.: 09/043,238

[22] PCT Filed: Sep. 16, 1996

[86] PCT No.: PCT/IE96/00062

§ 371 Date: Jun. 16, 1998

§ 102(e) Date: Jun. 16, 1998

[87] PCT Pub. No.: WO97/10596

PCT Pub. Date: Mar. 20, 1997

[30] Foreign Application Priority Data

Sep. 14, 1995 [IE] Ireland .................................... S950720
Dec. 8, 1995 [IE] Ireland .................................... S950926
Jul. 9, 1996 [IE] Ireland .................................... S960501

[51] Int. Cl.[7] ........................................ G11B 5/41
[52] U.S. Cl. ............................. 360/128; 360/134
[58] Field of Search .......................... 360/128, 132, 360/134; 15/DIG. 12, DIG. 13

[56] References Cited

U.S. PATENT DOCUMENTS

| 4,388,663 | 6/1983 | Becella ..................... 360/128 |
| 4,722,016 | 1/1988 | Shirako et al. ............ 360/128 |
| 4,941,065 | 7/1990 | Fritsch ...................... 360/128 |
| 4,984,120 | 1/1991 | Satoh et al. ............... 360/128 |
| 5,173,827 | 12/1992 | Boshek, Jr. ............... 360/128 |
| 5,355,271 | 10/1994 | Watanabe et al. ........ 360/137 |
| 5,396,392 | 3/1995 | Watanabe et al. ........ 360/132 |
| 5,841,613 | 11/1998 | DeMaster et al. ........ 360/128 |

FOREIGN PATENT DOCUMENTS

| 0028708 | 5/1981 | European Pat. Off. . |
| 0053191 | 6/1982 | European Pat. Off. . |
| 0210787 | 2/1987 | European Pat. Off. . |
| 0293804 | 12/1988 | European Pat. Off. . |
| 0427181 | 5/1991 | European Pat. Off. . |
| 0617427 | 9/1994 | European Pat. Off. . |
| 3434430 | 4/1985 | Germany . |
| 3527373 | 2/1987 | Germany . |
| 60-025080 | 2/1985 | Japan . |
| 62-125565 | 6/1987 | Japan . |
| 1-092919 | 4/1989 | Japan . |
| 5-217131 | 8/1993 | Japan . |
| 6-243440 | 9/1994 | Japan . |
| 1552270 | 9/1979 | United Kingdom . |
| 2152268 | 7/1985 | United Kingdom . |

*Primary Examiner*—Jefferson Evans
*Attorney, Agent, or Firm*—Sughrue, Mion, Zinn, Macpeak & Seas, PLLC

[57] ABSTRACT

A cleaning device (1) for cleaning components (4,5,6,7,9,10,11) of a video unit comprises a cassette housing (15) having a pair of spools (24) rotatably mounted therein. A cleaning tape (30) is wound onto the spools (24) and is transferred from one spool (24) to the other on rotation thereof. The cleaning tape (30) when in a cleaning position engages the components (4,5,5,7,9,10,11) of the video unit. The cleaning tape (30) defines a central longitudinal central axis (46) which defines a sinusoidal waveform so that as the cleaning tape is wound from one spool (24) to the other along the magnetic tape path, the cleaning tape (30) cycles progressively over the components (4,5,6,7,9,10,11) for cleaning the magnetic tape path area (40) of the component and margin areas (41,42) on opposite sides of the area (40). The cycling of the cleaning tape (30) may be achieved by mechanical means.

44 Claims, 12 Drawing Sheets

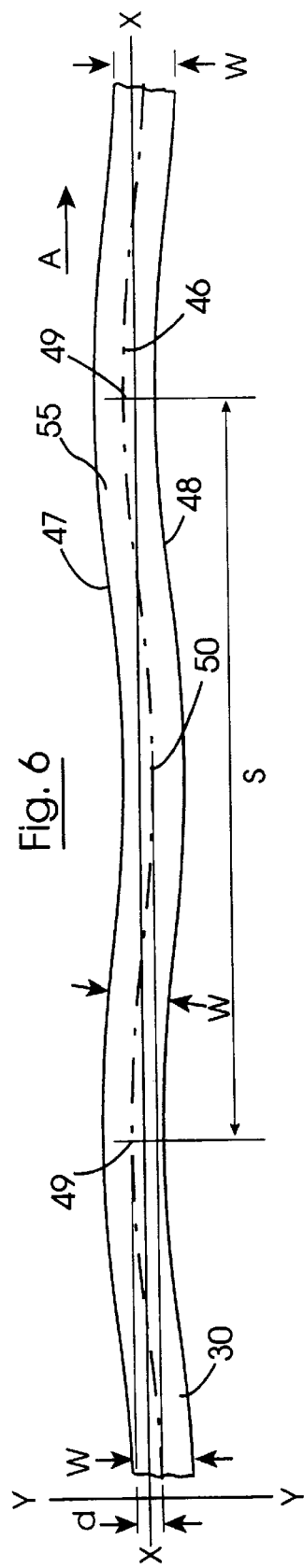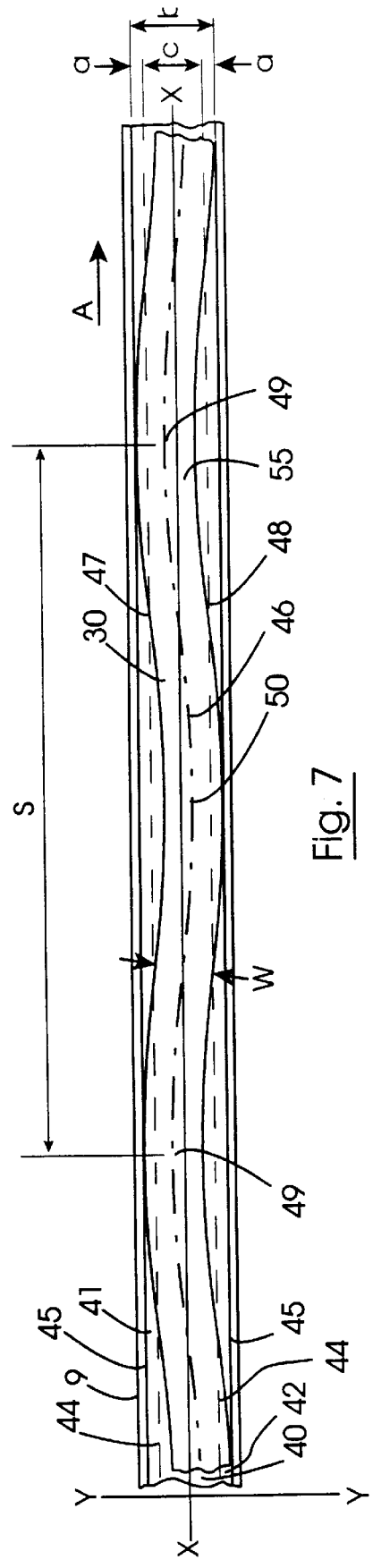

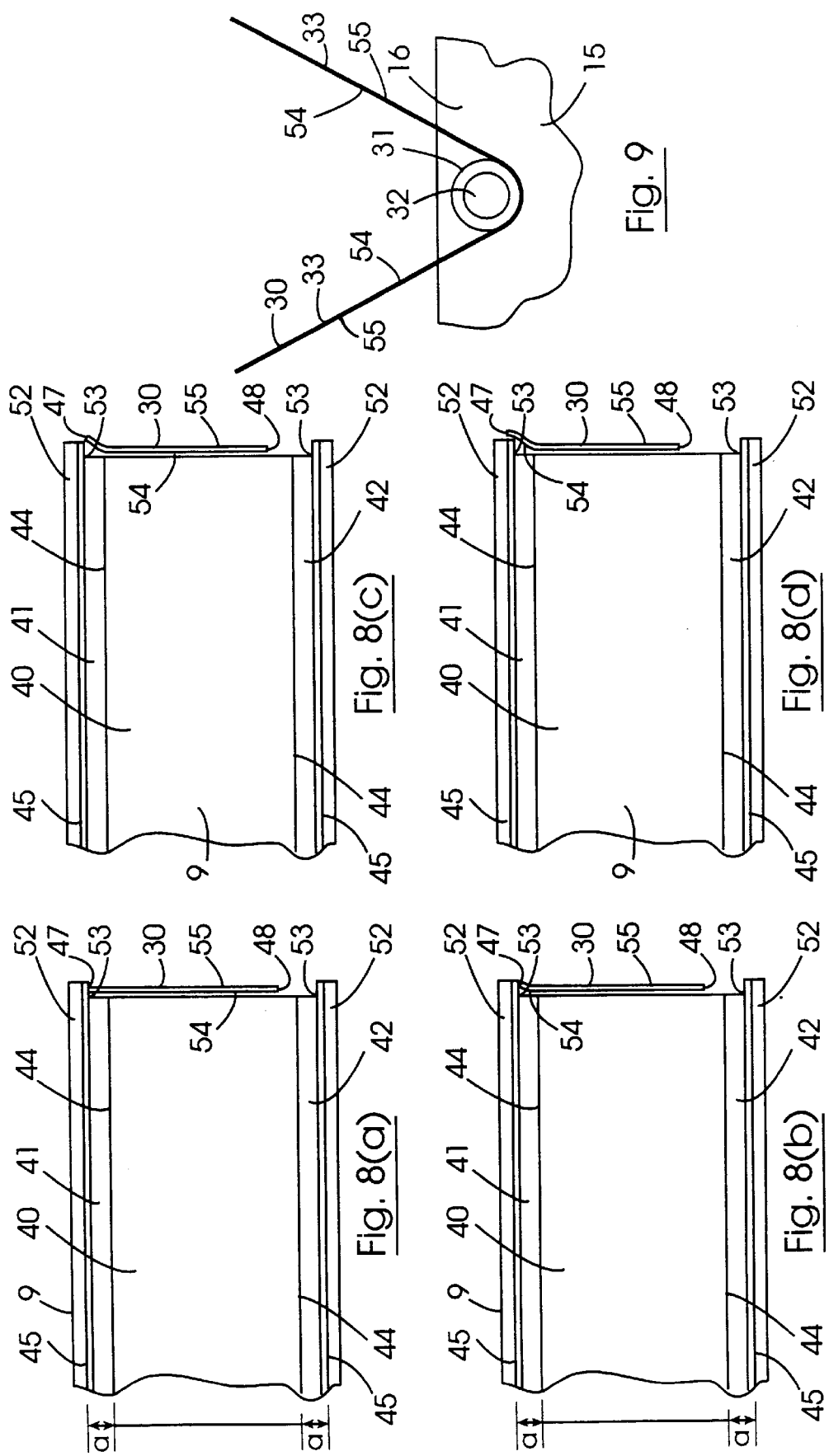

CLEANING DEVICE FOR CLEANING COMPONENTS OF A VIDEO UNIT AND FOR CLEANING OUTSIDE A TAPE PATH AREA

FIELD OF THE INVENTION

The present invention relates to a cleaning device for cleaning a component in a tape path in a machine unit in which a tape passes along and engages the component, and defines the tape path. The present invention also relates to a method for cleaning a component in the tape path. In particular, the present invention relates to a cleaning device for cleaning a recorder and/or playback unit, such as, for example, a video recorder and/or playback unit, or an audio recorder and/or playback unit, however, the present invention is not limited to a cleaning device for cleaning such recorder and/or playback units. As well, the present invention relates to a method for cleaning such a recorder and/or playback unit, although, the invention is not limited to such a method. The invention further relates to a cleaning tape for cleaning a component in a tape path in a machine unit in which a tape passes along and engages the component, and defines the tape path, and for example, the invention relates to but is not limited to a cleaning tape for cleaning a component in a tape path in a recorder and/or playback unit, such as, for example, a video recorder and/or playback unit or an audio recorder and/or playback unit.

DESCRIPTION OF THE PRIOR ART

Cleaning devices for cleaning recorder and/or playback units, such as, for example, video or audio recorder and/or playback units may comprise a cassette housing within which a cleaning tape is located for cleaning at least one of the components in the tape path of the recorder and/or playback unit. The cassette housing, in general, is substantially similar in size and shape to a conventional tape cassette housing.

A typical cleaning device for a video recorder and/or playback unit is described in European Patent Specification No. EP-A-0,210,787. The cleaning device of this European Specification relies on a cleaning tape and a cleaning brush for cleaning components in a magnetic tape path along which a conventional magnetic tape is drawn into and through the video unit during playing from and/or recording onto the magnetic tape. Typical of the components which are cleaned in the magnetic tape path are the video head, the video drum within which the video head is located, guide rollers which withdraw the tape from the video cassette housing and urge it into engagement with the video drum, the capstan and pinch rollers, sound head, erase head and the like. However, one of the difficulties experienced in cleaning these components with conventional tape cleaning devices which in general only comprise a cleaning tape and do not include a cleaning brush is that the cleaning tape is of width which is substantially similar to the width of a conventional magnetic tape and, in general, is of width identical to that of a conventional magnetic video tape. Since the magnetic tape, as it is drawn over the components in the magnetic tape path, rubs the surfaces that it touches, dirt particles and other debris tend not to collect on the components in the area over which the magnetic tape passes, but rather, to each side of the area over which the magnetic tape passes, in other words, on margin areas on each side of the magnetic tape path. Thus, since the width of conventional cleaning tapes is similar to the width of a magnetic video tape, the cleaning action of conventional tape cleaning devices is limited to the area of the path of a normal magnetic video tape, and thus, the margin areas on the components on each side of a normal magnetic tape path remain untouched by the cleaning tape. Because of this any build-up of dirt and other foreign matter which may collect on the margin areas adjacent the respective sides of the magnetic tape path remain undisturbed after cleaning. By providing a cleaning brush in the cleaning device of European Patent Specification No. EP-A-0,210,787 which cleans the drum, a significant proportion of this problem is overcome. However, in the case of components which are contacted only by the cleaning tape, any build-up of dirt or other foreign matter in the marginal areas outside the normal tape path remain undisturbed after cleaning.

Additionally, in conventional tape cleaning devices which rely solely on a cleaning tape, where the cleaning tape is re-used, dirt, debris and other foreign matter which may have collected on the cleaning tape on an earlier cleaning pass through the magnetic tape path of a recorder and/or playback unit can be deposited on components being cleaned in the magnetic tape path on a subsequent cleaning pass of the cleaning tape through the magnetic tape path. This, clearly, is undesirable, since after a cleaning pass in such a case, the component or components being cleaned may end up in a worse state after being allegedly cleaned.

There is therefore a need for a cleaning device for a video recorder and/or playback unit which facilitates cleaning of components in the magnetic tape path area and at least one, and preferably both margin areas on respective opposite sides of the magnetic tape path, so that dirt particles and any build-up of dirt or other foreign matter which may collect on the components on either side of the normal magnetic tape path is removed. There is also a need for a cleaning device for cleaning a component in other types of recorder and/or playback unit. Additionally, there is a need for a cleaning device for cleaning a component in a tape path in any machine unit in which a tape of any type passes along, and engages the component, and defines the tape path. There is also a need for a cleaning device of the type which comprises a cleaning tape in which the cleaning tape may be re-used. Further, there is a need for a method for cleaning a component in a tape path in a machine unit in which a tape passes along and engages the component and defines the tape path. There is also a need for a method for cleaning a component in the tape path of a recorder and/or playback unit. Additionally, there is a need for a cleaning tape for cleaning a component in a tape path in a machine unit in which a tape passes along and engages the component and defines the tape path, and there is also a need for a cleaning tape for cleaning a component in a tape path of a recorder and/or playback unit.

The present invention is directed towards providing such cleaning devices, a cleaning tape and cleaning methods.

SUMMARY OF THE INVENTION

According to the invention there is provided a cleaning device for cleaning at least one component in a tape path in a machine unit in which a tape passes along and defines the tape path and engages the at least one component, the tape path extending in a general X-axis direction, the cleaning device comprising a cleaning tape for placing in the tape path for engaging the at least one component in an area coinciding with the tape path for cleaning the tape path area of the component, wherein the cleaning tape also engages a margin area of the at least one component outside the magnetic tape path area in a Y-axis direction on at least one side of the tape path for cleaning the margin area.

In one embodiment of the invention the cleaning tape is located in a housing, and preferably, in a cassette type housing. Advantageously, the housing is adapted for engaging in a cassette receiving area of the machine unit.

According to the invention there is also provided a cleaning device for cleaning at least one component in a magnetic tape path of a recorder and/or playback unit, the magnetic tape path extending longitudinally in the unit in a general X-axis direction, the cleaning device comprising a housing for engaging in a cassette receiving area of the recorder and/or playback unit, a cleaning tape being located in the housing, a portion of the cleaning tape being exposed for cleaning the at least one component in an area corresponding to the magnetic tape path, wherein the cleaning tape also engages a margin area of the at least one component outside the magnetic tape path area in a Y-axis direction on at least one side of the magnetic tape path for cleaning the margin area.

Each margin area which is engaged by the cleaning tape in general, is located adjacent a corresponding side edge of the tape path, and where the tape path is defined by a magnetic tape, each margin area which is engaged by the cleaning tape is located adjacent a corresponding side edge of the magnetic tape path.

Preferably, each margin area which is being cleaned by the cleaning tape is intermittently engaged by the cleaning tape, and preferably, each margin area which is being cleaned by the cleaning tape is progressively engaged by the cleaning tape.

Ideally, the cleaning tape defines a side edge which progressively engages the margin area being cleaned for cleaning the margin area with a shearing type cleaning action. Preferably, the side edge of the cleaning tape for engaging the margin area being cleaned is a longitudinally extending side edge which extends in a generally X-axis direction relative to the tape path or the magnetic tape path.

In a preferred embodiment of the invention the cleaning tape engages each margin area being cleaned as the cleaning tape is being urged along the tape path or the magnetic tape path, and preferably, the cleaning tape engages respective margin edges on respective opposite sides of the tape path or the magnetic tape path for cleaning thereof.

In one embodiment of the invention the width of each margin area cleaned by the cleaning tape in the Y-axis direction is in the range of 0.75% to 25% of the width of the tape path or the magnetic tape path in the Y-axis direction. Preferably, the width of each margin area is in the range of 1% to 15% of the width of the tape path or the magnetic tape path, and advantageously, the width of each margin area is in the range of 3% to 10% of the width of the tape path or the magnetic tape path in the Y-axis direction, and ideally, the width of each margin area is in the range of 4% to 6% of the width of the tape path or the magnetic tape path.

Preferably, the cleaning tape alternately engages the margin areas on the respective opposite sides of the tape path or the magnetic tape path. Advantageously, the cleaning tape moves from side to side relative to the tape path or the magnetic tape path for cleaning the margin areas on the respective opposite sides of the tape path or the magnetic tape path. Ideally, the cleaning tape cycles between the margin areas on the respective opposite sides of the tape path or the magnetic tape path.

In a preferred embodiment of the invention the cleaning tape cycles progressively between the respective margin areas on the respective opposite sides of the tape path or the magnetic tape path.

The advantages of the invention for cleaning a component in a tape path of a machine unit in which a tape passes along and engages the component and defines the tape path are many. One of the most important advantages achieved by the invention is that at least one margin area and generally the margin areas on respective opposite sides of the tape path are cleaned on each component which is cleaned by the cleaning tape. Thus, any accumulations of dirt, debris and the like which typically, build up on the margin areas of the components on the respective opposite sides of the tape path are removed. By intermittently engaging the margin areas, a more effective cleaning action is achieved. By progressively engaging the margin areas, a still more effective cleaning action is achieved. This, is because the cleaning tape by moving progressively over each margin area tends to act with a shearing type action on the dirt and debris accumulations in the margin areas. This advantage is even more noticeable when a side edge of the cleaning tape progressively engages the margin area. The side edge by progressively engaging the margin area tends to act with a scraping, shearing type action which in addition to the normal rubbing action of the cleaning tape tends to shear the dirt and debris from the margin area. In practice, accumulations of dirt and debris tend to accumulate in the margin areas relatively closely to the respective side edges of the tape path. Thus, once the cleaning tape cleans the margin areas adjacent the respective opposite sides of the tape path the majority of accumulations of dirt and debris are removed.

By moving the cleaning tape from side to side in the Y-axis direction relative to the tape path for cleaning the margin areas, a further advantage is achieved in that the load on the cleaning tape is reduced, since effectively the margin areas on respective opposite sides are being alternately cleaned. This advantage is further noticeable when the cleaning tape cycles from the margin area on one side of the tape path to that on the other side of the tape path.

The advantages achieved by the cleaning device according to the invention for cleaning at least one component in a magnetic tape path of a recorder and/or playback unit are substantially similar to those just discussed. One of the most important advantages achieved by this form of the invention is that margin areas on respective opposite sides of the magnetic tape path are cleaned on each component which is cleaned by the cleaning tape. Thus, any accumulation of dirt, debris and the like which typically, builds up on the margin areas of the components on the respective opposite sides of the magnetic tape path is removed. By intermittently engaging the margin areas, a more effective cleaning action is achieved. By progressively engaging the margin areas, a still more effective cleaning action is achieved. This, is because the cleaning tape by moving progressively over each margin area tends to act with a shearing type action on the dirt and debris accumulations in the margin areas. This advantage is even more noticeable when a side edge of the cleaning tape progressively engages the margin area. The side edge by progressively engaging the margin area tends to act with a scraping shearing type action which in addition to the normal rubbing action of the cleaning tape tends to shear the debris from the margin area. In practice, accumulations of dirt and debris tend to accumulate in the margin areas relatively closely to the respective side edges of the magnetic tape path. Typically, such accumulations tend to occur in the margin areas up to approximately 6% of the width of the magnetic tape path. Thus, once the cleaning tape cleans the margin areas adjacent the respective opposite sides of the magnetic tape path to a width of up to 6% of the width of the magnetic tape path the majority of accumulations of dirt and debris are removed. In general, there are little accumulations of dirt and debris beyond margin areas of width greater than 6% of the magnetic tape path. Similarly, as in the case of the cleaning device for cleaning a component in a machine unit, the load on the cleaning tape is reduced, since effectively the margin areas on respective opposite sides of the magnetic tape path are being alternately cleaned.

In one embodiment of the invention the cleaning tape is dimensioned for cleaning each margin area to be cleaned, and preferably, the cleaning tape is shaped so that as the cleaning tape is urged along the tape path or the magnetic tape path in the X-axis direction the cleaning tape cleans each margin area to be cleaned.

By dimensioning and shaping the cleaning tape in order to clean the margin areas, a particularly advantageous form of the cleaning device is provided. Effective cleaning of the margin areas is achieved without any additional mechanical drives for moving the tape or cycling the tape from the margin area of one side of the tape path or the magnetic tape path to the margin area on the other side. The cycling action is achieved by merely urging the cleaning tape along the tape path or the magnetic tape path.

Preferably, the cleaning tape when viewed in plan defines a longitudinally extending central axis, which extends in a generally X-axis direction, and in use extends in the general direction of the tape path or the magnetic tape path, the longitudinal central axis of the cleaning tape defining a waveform which alternates in a Y-axis direction positively and negatively about the X-axis. This feature provides a cleaning tape which intermittently, and alternately cycles from the margin area on one side of the tape path or the magnetic tape path to that on the other side of the tape path or the magnetic tape path.

Preferably, the longitudinal central axis of the cleaning tape alternates progressively in the Y-axis direction about the X-axis for achieving progressive movement of the cleaning tape over the respective margin areas.

In one embodiment of the invention the longitudinal central axis of the cleaning tape defines a sinusoidal type waveform.

In one embodiment of the invention the transverse width of the cleaning tape perpendicular to the longitudinal central axis, and the peak to peak value of the waveform defined by the longitudinal central axis of the cleaning tape in the Y-axis direction is such that the cleaning tape progressively and sequentially engages the respective margin areas of each component being cleaned.

Ideally, the transverse width of the cleaning tape perpendicular to the longitudinal central axis of the cleaning tape is substantially similar to the width of the tape path or the magnetic tape path.

In one aspect of the invention the transverse width of the cleaning tape perpendicular to the longitudinal central axis of the cleaning tape is substantially similar to the transverse width of a tape or a magnetic tape for use in a recorder and/or playback unit, for example, a video or audio recorder and/or playback unit.

In one embodiment of the invention the transverse width of the cleaning tape perpendicular to the longitudinal central axis of the cleaning tape is approximately 12.7 mm.

In another embodiment of the invention the peak to peak value of the waveform defined by the longitudinal central axis of the cleaning tape in the Y-axis direction lies in the range of 0.2 mm to 6 mm. The peak to peak value in the Y-axis direction is the distance from a positive peak of the waveform defined by the longitudinal central axis to the next adjacent negative peak measured in the Y-axis direction.

In another embodiment of the invention the peak to peak value of the waveform defined by the longitudinal central axis of the cleaning tape lies in the range of 0.3 mm to 4 mm. Preferably, the peak to peak value of the waveform defined by the longitudinal central axis of the cleaning tape lies in the range of 0.8 mm to 2.5 mm, and advantageously, the peak to peak value of the waveform defined by the longitudinal central axis of the cleaning tape lies in the range 1 mm to 1.5 mm.

In one embodiment of the invention the transverse width of the cleaning tape perpendicular to the longitudinal central axis is substantially constant.

It will be appreciated that the width of the margin areas which are cleaned by the cleaning tape is a function of the tape width perpendicular to the longitudinal central axis, and the peak to peak value of the waveform defined by the longitudinal central axis in the Y-axis direction. In order to clean margin areas of reasonable width, where the cleaning tape is relatively narrow, the peak to peak value in the Y-axis direction of the waveform defined by the longitudinal central axis should be relatively large, and vice versa.

In another embodiment of the invention a means for moving the cleaning tape in the Y-axis direction for engaging the respective margin areas is provided. In one embodiment of the invention the means for moving the cleaning tape in the Y-axis direction is located in the housing. Preferably, the means for moving the cleaning tape in the Y-axis direction comprises a bearing means engagable with the cleaning tape. Advantageously, the bearing means is moveable for moving the cleaning tape in the Y-axis direction, and preferably, the bearing means defines a bearing surface for engaging the cleaning tape, the bearing surface defining a bearing axis.

In one embodiment of the invention the bearing means comprises a roller which defines the bearing surface, the roller being rotatably mounted in the housing about a rotational axis which is parallel to the Y-axis direction, the bearing axis being inclined to the rotational axis of the roller for causing the cleaning tape to oscillate along the bearing surface of the roller in a generally Y-axis direction as the roller rotates about its rotational axis.

Alternatively, the bearing axis extends parallel to the Y-axis, the bearing means being moveable longitudinally along the bearing axis for moving the cleaning tape in the Y-axis direction.

Ideally, a drive transmission means is cooperable with the bearing means for moving or rotating the bearing means for in turn moving the cleaning tape in the Y-axis direction. Preferably, drive transmission means is cooperable with the recorder and/or playback unit for receiving drive therefrom.

In one embodiment of the invention the cleaning tape is provided with one cleaning surface. Preferably, the cleaning tape is provided with two opposite cleaning surfaces.

Advantageously, the cleaning tape comprises a flexible tape.

In one embodiment of the invention the cleaning tape is of a plastics material.

In another embodiment of the invention each cleaning surface of the cleaning tape is a textured cleaning surface, and ideally, the texturing of the cleaning surface should preferably only extend to a depth of a few microns. Ideally, each cleaning surface has an affinity for retaining a cleaning fluid.

In another embodiment of the invention a tape cleaning means is provided for cooperating with the cleaning tape for cleaning the cleaning tape so that the cleaning tape may be used more than once. Preferably, the tape cleaning means is located in the housing for cleaning the cleaning tape as the cleaning tape enters or exits from the housing.

Advantageously, the tape cleaning means is located adjacent a portion of the housing which in use is adjacent a capstan and pinch roller of the recorder and/or playback unit.

In one embodiment of the invention the tape cleaning means cleans at least one cleaning surface of the cleaning tape. In another embodiment of the invention the tape cleaning means cleans both cleaning surfaces of the cleaning tape.

In another embodiment of the invention the tape cleaning means is a cleaning brush.

Preferably, the tape cleaning means is mounted for urging the tape cleaning means into light engagement with the cleaning tape, and preferably, the tape cleaning means is mounted relative to the housing for urging the tape cleaning means into light engagement with the cleaning tape, and ideally, the tape cleaning means is resiliently mounted, for example, in the housing for lightly urging the tape cleaning means into engagement with the cleaning tape.

In another embodiment of the invention a capstan and pinch roller cleaning means is provided, the tape cleaning means and the capstan and pinch roller cleaning means being cooperable for cleaning the cleaning tape.

In one embodiment of the invention a means for urging the cleaning tape along the tape path or the magnetic tape path is provided. Preferably, the means for urging the cleaning tape along the tape path or the magnetic tape path is cooperable with a drive means in the machine unit or the recorder and/or playback unit for urging the cleaning tape along the tape path or the magnetic tape path.

In one embodiment of the invention the urging means comprises a pair of cleaning tape carrying spools which are rotatably mounted in the housing about a pair of spaced apart parallel rotational axis, the spools being engagable with corresponding drive and idler spindles of the recorder and/or playback unit for rotation thereof, the cleaning tape being wound onto the respective spools, and being transferable from one spool to the other on rotation of the respective spools.

In one embodiment of the invention the exposed portion of the cleaning tape is located externally of the housing and is engagable with a guide means of the recorder and/or playback unit and is moveable by the guide means from an inoperative position adjacent the housing to a cleaning position engaging the components to be cleaned in the magnetic tape path.

In one embodiment of the invention the cleaning device is for cleaning components in a video recorder and/or playback unit, the cleaning tape being engagable with the video drum when the cleaning tape is in the cleaning position.

In another embodiment of the invention a retaining means is provided for retaining a portion of the cleaning tape spaced apart from a video drum of the video unit when the cleaning tape is in the cleaning position, so that the cleaning tape in the cleaning position contacts the video drum in at least one location which is of arcuate length shorter than the arcuate length of normal contact of a magnetic tape with the video drum. Preferably, the retaining means retains the portion of the cleaning tape spaced apart from the video drum when the cleaning tape is in the cleaning position so that the cleaning tape in the cleaning position contacts the video drum at two spaced apart locations, and engages the retaining means intermediate the two spaced apart locations.

In one embodiment of the invention the retaining means comprises a retaining bearing member. Preferably, the retaining bearing member is located in the housing. Advantageously, the retaining bearing member is located adjacent a front face of the housing, and the cleaning tape extends behind the retaining bearing member relative to the housing.

In one embodiment of the invention the retaining bearing member comprises an elongated shaft, and preferably, the retaining bearing member comprises a retaining roller which is rotatably mounted on the shaft for engaging the cleaning tape.

In a further embodiment of the invention the retaining means is provided by the bearing means.

According to the invention there is also provided a cleaning device for cleaning at least one component in a tape path of a recorder and/or playback unit, the tape path extending longitudinally in the unit in a general X-axis direction, the cleaning device comprising a housing for engaging in a cassette receiving area of the recorder and/or playback unit, a cleaning tape being located in the housing, a portion of the cleaning tape being exposed for cleaning the at least one component in an area corresponding to the tape path, wherein a tape cleaning means is provided for cooperating with the cleaning tape for cleaning the cleaning tape so that the cleaning tape may be used more than once.

In one embodiment of the invention the tape cleaning means is located in the housing for cleaning the cleaning tape as the cleaning tape enters or exits from the housing. Preferably, the tape cleaning means is located adjacent a portion of the housing which in use is adjacent a capstan and pinch roller of the recorder and/or playback unit. Advantageously, the tape cleaning means cleans at least one cleaning surface of the cleaning tape. Ideally, the tape cleaning means cleans both cleaning surfaces of the cleaning tape.

In one embodiment of the invention the tape cleaning means is a cleaning brush which provides particularly effective cleaning of the cleaning tape.

In another embodiment of the invention the tape cleaning means is mounted relative to the housing for urging the tape cleaning means into light engagement with the cleaning tape, whereby the light engagement is sufficient for the purpose of cleaning the cleaning tape, but is not excessive so that frictional drag between the cleaning tape and the tape cleaning means is minimised.

Ideally, the tape cleaning means is resiliently mounted in the housing for lightly urging the tape cleaning means into engagement with the cleaning tape.

In another embodiment of the invention a capstan and pinch roller cleaning means is provided, the tape cleaning means and the capstan and pinch roller cleaning means being cooperable for cleaning the cleaning tape. In another embodiment of the invention a means for urging the cleaning tape along the tape path is provided.

Preferably, the means for urging the cleaning tape along the tape path is cooperable with the recorder and/or playback unit for urging the cleaning tape along the tape path.

Advantageously, the urging means comprises a pair of cleaning tape carrying spools which are rotatably mounted in the housing about a pair of spaced apart parallel rotational axis, the spools being engagable with corresponding drive and idler spindles of the recorder and/or playback unit for rotation thereof, the cleaning tape being wound onto the respective spools, and being transferable from one spool to the other on rotation of the respective spools.

In another embodiment of the invention the exposed portion of the cleaning tape is located externally of the housing and is engagable with a guide means of the recorder and/or playback unit and is moveable by the guide means from an inoperative position adjacent the housing to a cleaning position engaging the components to be cleaned in the tape path.

In a further embodiment of the invention the cleaning device is for cleaning components in a video recorder and/or playback unit, the cleaning tape being engagable with the video drum when the cleaning tape is in the cleaning position.

In a still further embodiment of the invention a retaining means is provided for retaining a portion of the cleaning tape spaced apart from a video drum of the video unit when the cleaning tape is in the cleaning position, so that the cleaning tape in the cleaning position contacts the video drum in at least one location which is of arcuate length shorter than the arcuate length of normal contact of a magnetic tape with the video drum. This, minimises frictional drag between the cleaning tape and the video drum, while at the same time achieves effective cleaning.

Preferably, the retaining means retains the portion of the cleaning tape spaced apart from the video drum when the cleaning tape is in the cleaning position so that the cleaning tape in the cleaning position contacts the video drum at two spaced apart locations, and engages the retaining means intermediate the two spaced apart locations.

In one embodiment of the invention the retaining means comprises a retaining bearing member.

In another embodiment of the invention the retaining bearing member is located in the housing.

Preferably, the retaining bearing member is located adjacent a front face of the housing, and the cleaning tape extends behind the retaining bearing member relative to the housing. Advantageously, the retaining bearing member comprises an elongated shaft.

Ideally, the tape cleaning means is releasably mounted in the housing for facilitating removal thereof for cleaning and/or replacing with a fresh tape cleaning means.

Additionally, the invention provides a cleaning tape for cleaning at least one component in a tape path in a machine unit in which a tape passes along and defines the tape path and engages the at least one component, the tape path extending in a general X-axis direction, the cleaning tape being adapted for placing in the tape path for engaging the at least one component in an area coinciding with the tape path and for cleaning the tape path area of the component as the cleaning tape is urged along the tape path, wherein the cleaning tape is also adapted for engaging a margin area of the at least one component outside the tape path area in a Y-axis direction on at least one side of the tape path for cleaning the margin area.

Preferably, the cleaning tape defines a side edge which is adapted for progressively engaging the margin area being cleaned for cleaning the margin area with a shearing type cleaning action. Advantageously, the side edge of the cleaning tape which is adapted for engaging the margin area being cleaned is a longitudinally extending side edge which extends in a generally X-axis direction relative to the tape path.

In one embodiment of the invention the cleaning tape is adapted for engaging each margin area being cleaned as the cleaning tape is being urged along the tape path.

In another embodiment of the invention the cleaning tape engages respective margin edges on respective opposite sides of the tape path for cleaning thereof.

In a further embodiment of the invention the cleaning tape is adapted for alternately engaging the margin areas on the respective opposite sides of the tape path.

Preferably, the cleaning tape is adapted for moving from side to side relative to the tape path for cleaning the margin areas on the respective opposite sides of the tape path. Advantageously, the cleaning tape is adapted for cycling between the margin areas on the respective opposite sides of the tape path. Ideally, the cleaning tape is adapted for cycling progressively between the respective margin areas on the respective opposite sides of the tape path.

Preferably, the cleaning tape is adapted for intermittently engaging each margin area to be cleaned as the cleaning tape is urged along the tape path.

In one embodiment of the invention the cleaning tape is dimensioned for cleaning each margin area to be cleaned.

In another embodiment of the invention the cleaning tape is shaped so that as the cleaning tape is urged along the tape path in the X-axis direction the cleaning tape cleans each margin area to be cleaned.

Preferably, the cleaning tape when viewed in plan defines a longitudinally extending central axis, which extends in a generally X-axis direction, and in use extends in the general direction of the tape path, the longitudinal central axis of the cleaning tape defining a waveform which alternates in a Y-axis direction positively and negatively about the X-axis. Preferably, the longitudinal central axis of the cleaning tape alternates progressively in the Y-axis direction about the X-axis.

In one embodiment of the invention the longitudinal central axis of the cleaning tape defines a sinusoidal type waveform.

In one embodiment of the invention the transverse width of the cleaning tape perpendicular to the longitudinal central axis, and the peak to peak value of the waveform defined by the longitudinal central axis of the cleaning tape in the Y-axis direction is such that the cleaning tape progressively and sequentially engages the respective margin areas of each component being cleaned. Preferably, the transverse width of the cleaning tape perpendicular to the longitudinal central axis of the cleaning tape is substantially similar to the width of the tape path. In one embodiment of the invention the transverse width of the cleaning tape perpendicular to the longitudinal central axis of the cleaning tape is substantially similar to the transverse width of a tape for use in a recorder and/or playback unit.

In another embodiment of the invention the transverse width of the cleaning tape perpendicular to the longitudinal central axis of the cleaning tape is substantially similar to the transverse width of a magnetic tape for use in a recorder and/or playback unit.

In a further embodiment of the invention the transverse width of the cleaning tape perpendicular to the longitudinal central axis of the cleaning tape is substantially similar to the transverse width of a tape for use in an audio recorder and/or playback unit.

In a further embodiment of the invention the transverse width of the cleaning tape perpendicular to the longitudinal central axis of the cleaning tape is substantially similar to the transverse width of a tape for use in an video recorder and/or playback unit.

In one embodiment of the invention the transverse width of the cleaning tape perpendicular to the longitudinal central axis is substantially constant.

Preferably, the cleaning tape is provided with one cleaning surface. Advantageously, the cleaning tape is provided with two opposite cleaning surfaces.

Ideally, the cleaning tape is of a flexible material. Further, the invention provides a cleaning device for cleaning at least one component in a tape path in a machine unit in which a tape passes along and defines the tape path and engages the at least one component, the tape path extending in a general X-axis direction, the cleaning device comprising a cleaning tape for placing in the tape path for engaging the at least one component in an area coinciding with the tape path for cleaning the tape path area of the component, wherein a tape cleaning means is provided for cooperating with the cleaning tape for cleaning the cleaning tape so that the cleaning tape may be used more than once.

Additionally, the invention provides a method for cleaning at least one component in a tape path in a machine unit in which a tape passes along and defines the tape path and engages the at least one component, the tape path extending in a general X-axis direction, the method comprising placing a cleaning tape in the tape path for engaging the at least one component in an area coinciding with the tape path for cleaning the tape path area of the component, wherein the method further comprises the step of engaging the cleaning tape with a margin area of the at least one component outside the tape path area in a Y-axis direction on at least one side of the tape path for cleaning thereof.

Further, the invention provides a method for cleaning at least one component in a magnetic tape path of a recorder and/or playback unit, the magnetic tape path extending longitudinally in the unit in a general X-axis direction, the method comprising placing a cleaning tape in the magnetic tape path of the recorder and/or playback unit for engaging the at least one component in an area corresponding to the magnetic tape path for cleaning thereof, wherein the method further comprises the step of engaging the cleaning tape with a margin area of the at least one component outside the tape path area in a Y-axis direction on at least one side of the magnetic tape path for cleaning thereof.

Preferably, each margin area which is engaged by the cleaning tape is located adjacent a corresponding side edge of the tape path or the magnetic tape path. Advantageously, the cleaning tape intermittently engages each margin area which is being cleaned by the cleaning tape.

Preferably, the cleaning tape progressively engages each margin area which is being cleaned by the cleaning tape.

Advantageously, the cleaning tape defines a side edge, and the said edge progressively engages the corresponding margin area being cleaned for cleaning the margin area with a shearing type cleaning action.

Ideally, the side edge of the cleaning tape for engaging the margin area being cleaned is a longitudinally extending side edge which extends in a generally X-axis direction relative to the tape path or the magnetic tape path.

In one embodiment of the invention the cleaning tape engages each margin area being cleaned as the cleaning tape is being urged along the tape path or the magnetic tape path.

In a further embodiment of the invention the cleaning tape engages respective margin edges on respective opposite sides of the tape path or the magnetic tape path for cleaning thereof.

In one embodiment of the invention the width of each margin area cleaned by the cleaning tape in the Y-axis direction is in the range of 0.75% to 25% of the width of the tape path or the magnetic tape path in the Y-axis direction. Preferably, the width of each margin area cleaned by the cleaning tape in the Y-axis direction is in the range of 1% to 15% of the width of the tape path or the magnetic tape path in the Y-axis direction. Advantageously, the width of each margin area cleaned by the cleaning tape in the Y-axis direction is in the range of 3% to 10% of the width of the tape path or the magnetic tape path in the Y-axis direction, and ideally, the width of each margin area cleaned by the cleaning tape in the Y-axis direction is in the range of 4% to 6% of the width of the tape path or the magnetic tape path in the Y-axis direction.

It is preferable that the cleaning tape alternately engages the margin areas on the respective opposite sides of the tape path or the magnetic tape path, and preferably, the cleaning tape moves from side to side relative to the tape path or the magnetic tape path for cleaning the margin areas on the respective opposite sides of the tape path or the magnetic tape path.

Preferably, the cleaning tape cycles between the margin areas on the respective opposite sides of the tape path or the magnetic tape path, and advantageously, the cleaning tape cycles progressively between the respective margin areas on the respective opposite sides of the tape path or the magnetic tape path.

Further, the invention provides a method for cleaning at least one component in a tape path of a recorder and/or playback unit, the tape path extending longitudinally in the unit in a general X-axis direction, the method comprising placing a cleaning tape in the tape path of the recorder and/or playback unit for engaging the at least one component in an area corresponding to the tape path for cleaning thereof, wherein the cleaning tape is passed by a tape cleaning means before or after cleaning the at least one component to be cleaned for cleaning the cleaning tape so that the cleaning tape may be used more than once.

The cleaning devices and methods of the present invention are particularly suitable for cleaning components in the tape path of a video playback and/or recorder unit, and indeed the cleaning devices and methods according to the invention are also suitable for cleaning components in the tape path of any other recorder and/or playback unit, for example, an audio tape recorder and/or playback unit.

A further advantage of the invention is achieved by providing the tape cleaning means for cleaning the cleaning tape. This permits the cleaning tape to be re-used many times, since the tape cleaning means cleans any dirt and debris which accumulates on the cleaning tape during a cleaning pass.

The invention will be more clearly understood from the following description of some preferred embodiments thereof which are given by way of example only with reference to the accompanying drawings in which:

BRIEF DESCRIPTION OF THE DRAWINGS

FIG. 6 is a plan view of a portion of the cleaning device of FIG. 1, FIG. 7 is a plan view of the portion of the cleaning device which is illustrated in FIG. 6 in use, FIG. 8(a) to (d) are enlarged plan views of the portion of the cleaning device which is illustrated in FIG. 6, also in use, FIG. 9 is a plan view of a detail of the cleaning device of FIG. 1 illustrated in use.

DETAILED DESCRIPTION OF PREFERRED EMBODIMENTS OF THE INVENTION

Figure 1:
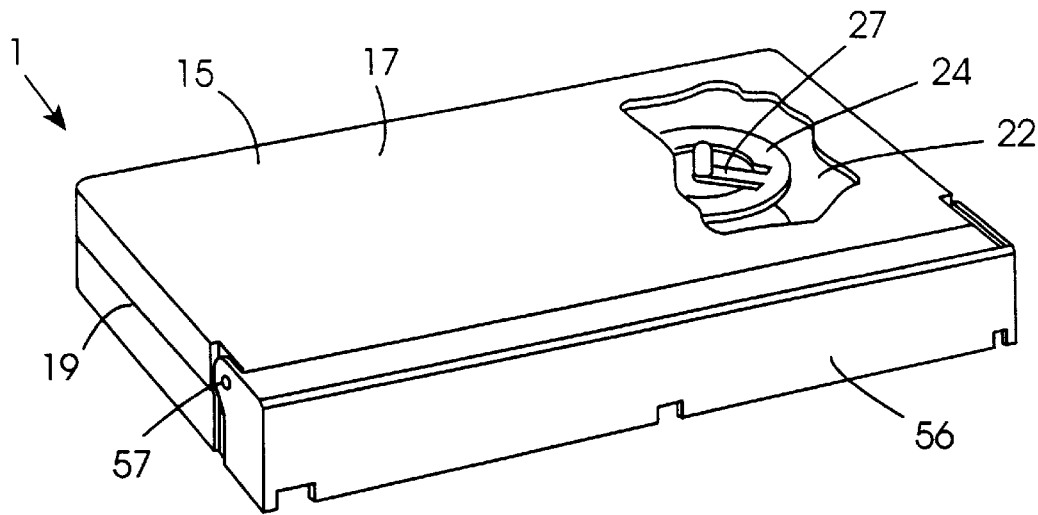
FIG. 1 is a top perspective view of a cleaning device according to one embodiment of the invention for cleaning a video unit.
Figure 2:
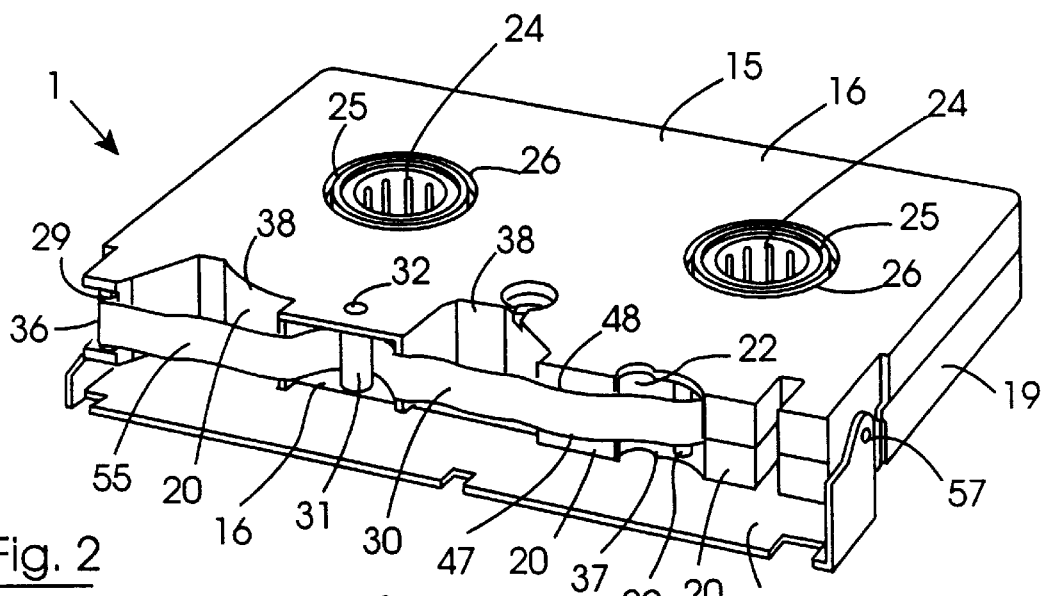
FIG. 2 is an underneath perspective view of the cleaning device of FIG. 1.
Figure 3:
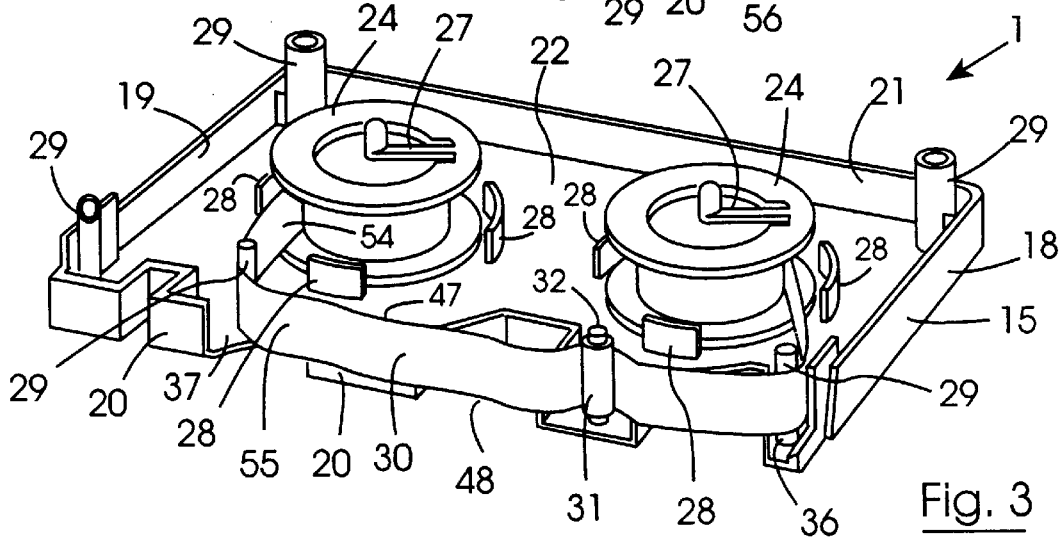
FIG. 3 is a top perspective view of a portion of the cleaning device of FIG. 1.
Figure 4:
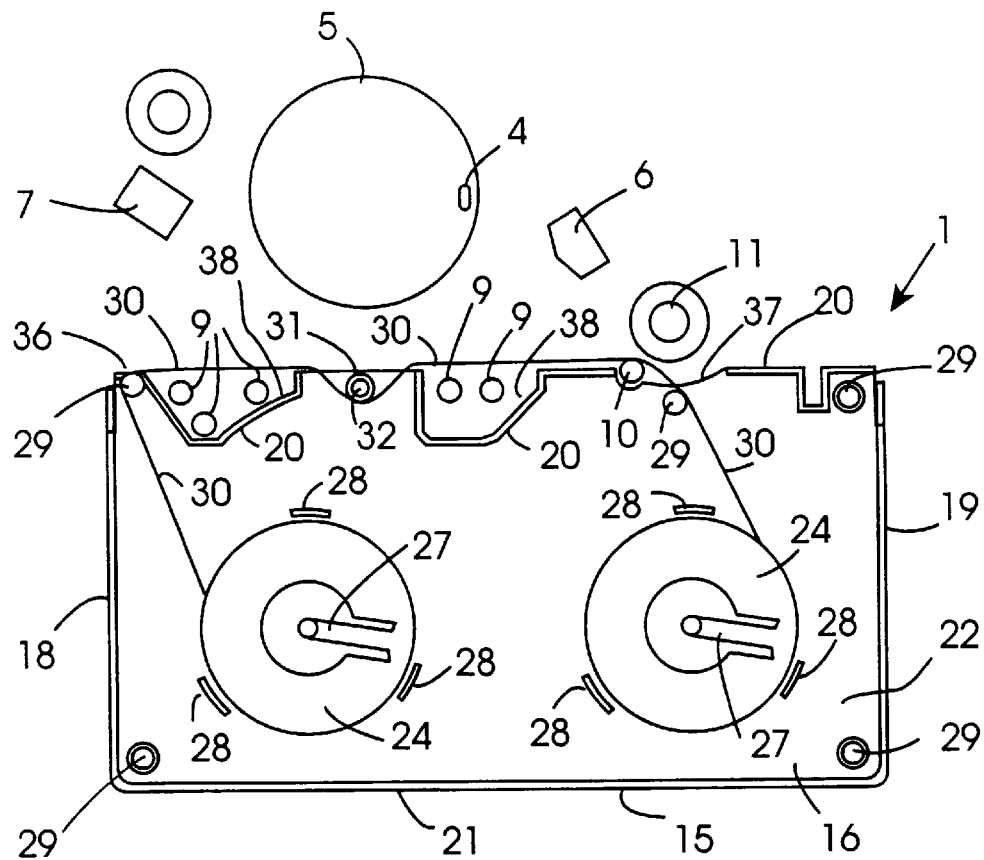
FIG. 4 is a plan view of the cleaning device of FIG. 1 illustrated in a cassette receiving area of a video unit.
Figure 5:
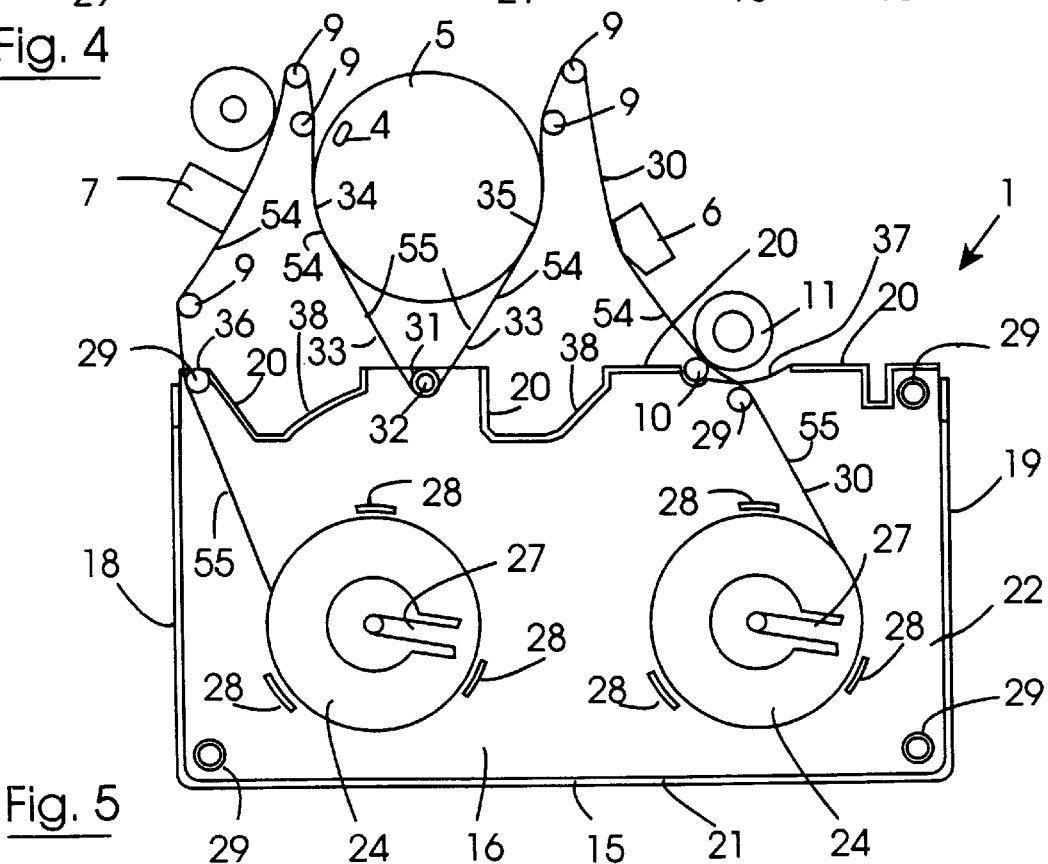
FIG. 5 is a plan view similar to FIG. 4 illustrating the cleaning device in use cleaning components in the video unit.
Figure 10:
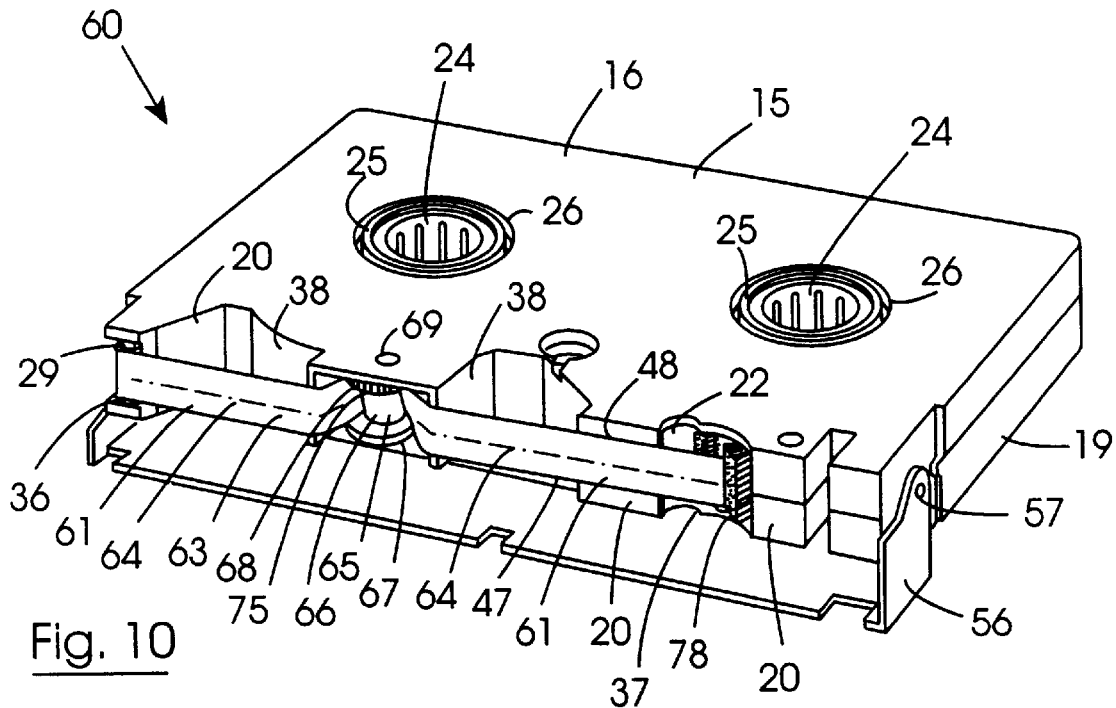
FIG. 10 is an underneath perspective view of the cleaning device according to another embodiment of the invention.
Figure 11:
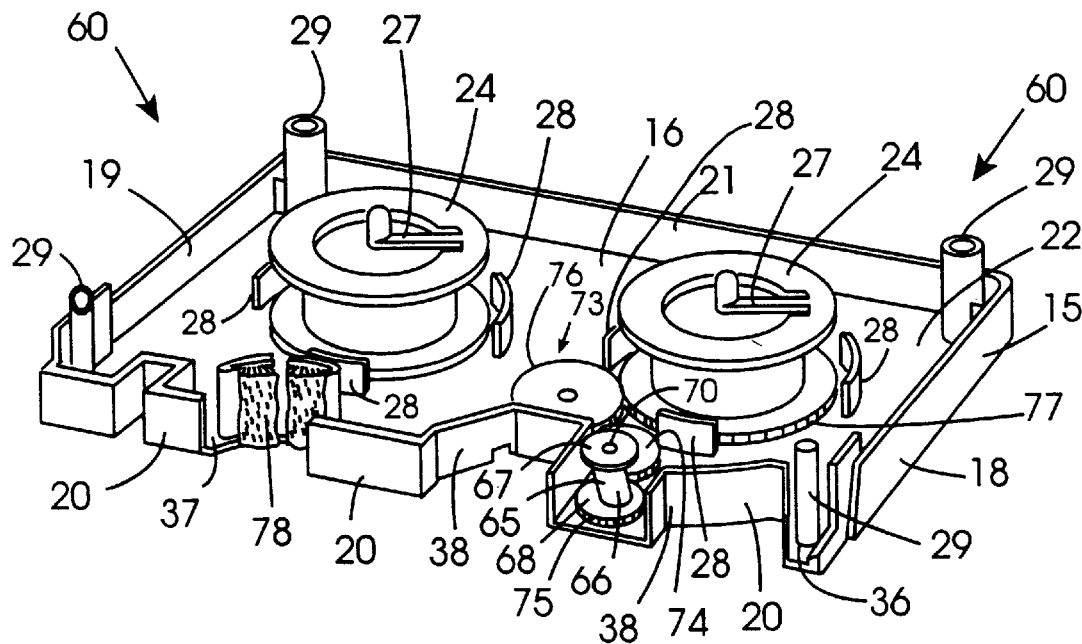
FIG. 11 is a top perspective view of a portion of the cleaning device of FIG. 10.
Figure 12:
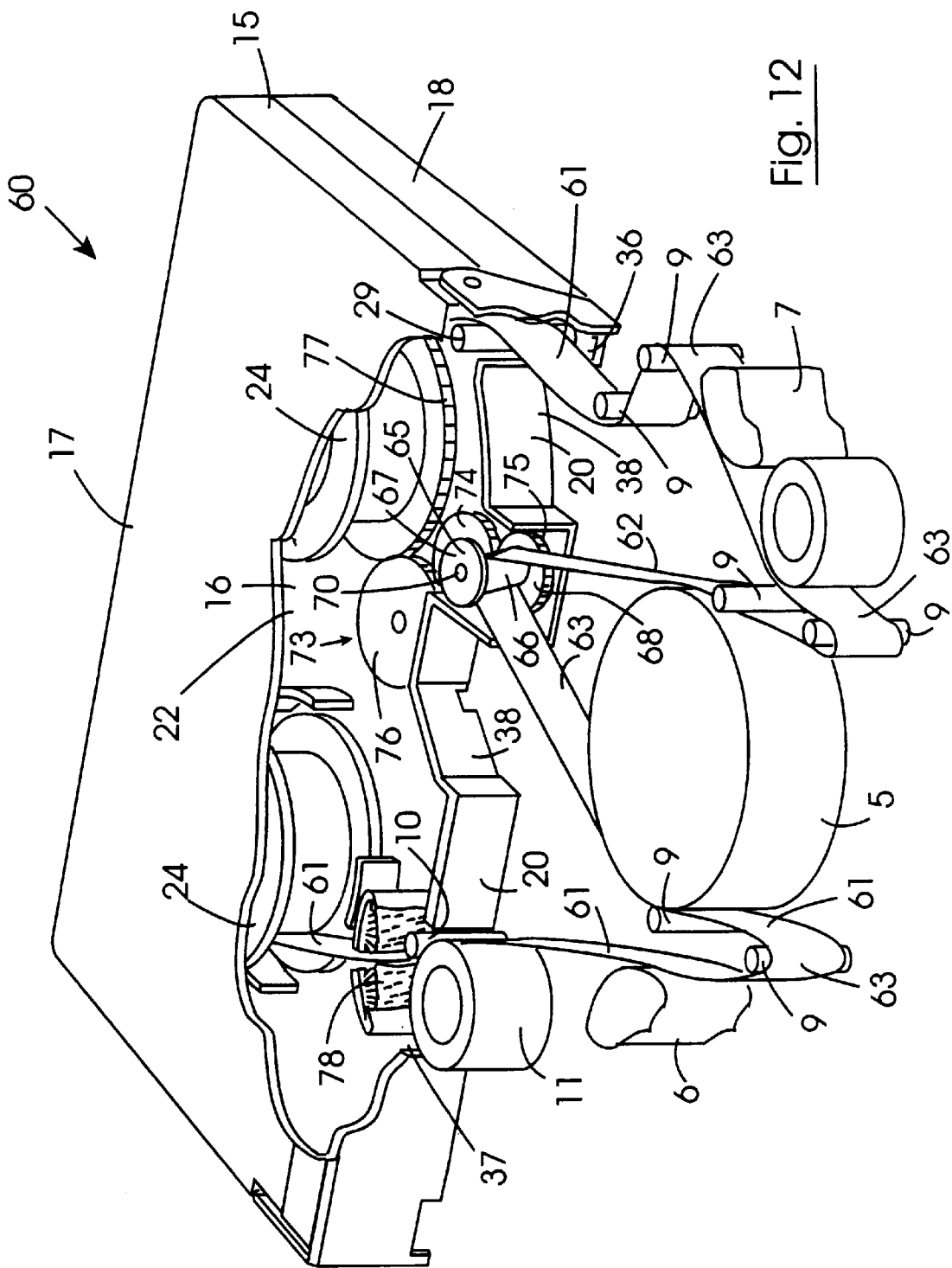
FIG. 12 is a cut away top perspective view of the cleaning devices of FIG. 10 illustrated in use.
Figure 13:
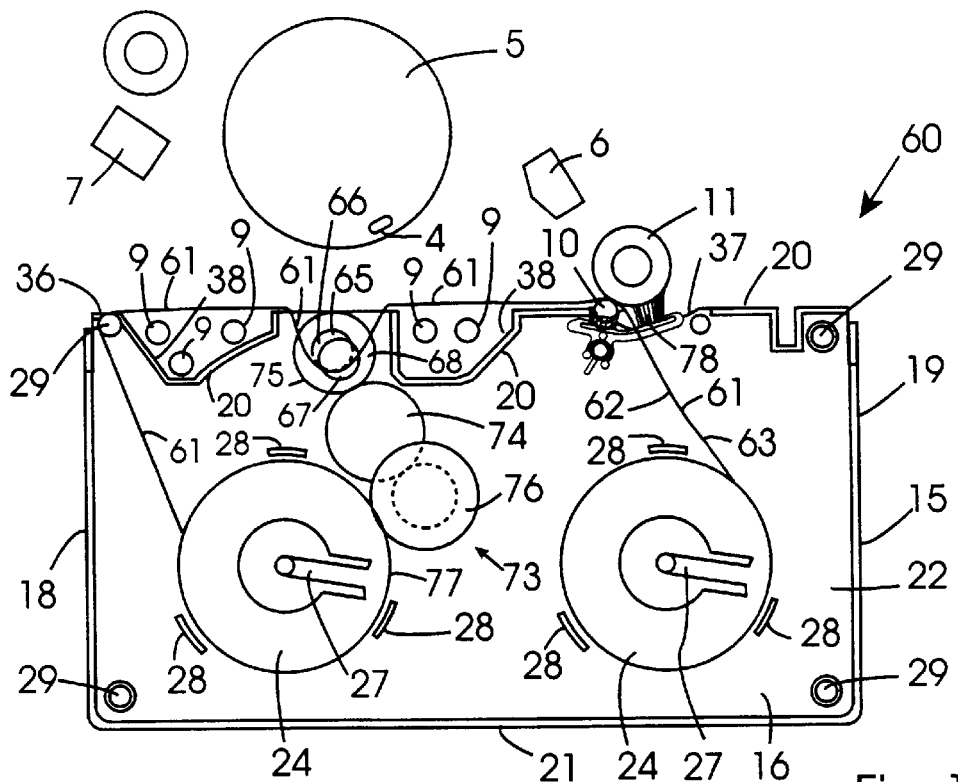
FIG. 13 is a plan view of the cleaning device of FIG. 10 illustrated in a cassette receiving portion of a video unit.

Referring to the drawings and initially to FIGS. 1 to 9 there is illustrated a cleaning device according to the invention indicated generally by the reference numeral 1 for cleaning components of a video recorder and/or playback unit. Only some of the components of the video recorder and/or playback unit are illustrated in FIGS. 4 and 5, however, such video units will be well known to those skilled in the art. Before describing the cleaning device 1, the relevant aspects of the video unit will first be described briefly.

The video unit comprises a cassette receiving area for receiving a cassette housing of a video tape cassette. Adjacent the cassette receiving area is a video drum 5 within which is located a video recording and playback head 4. Sound and erase heads 6 and 7, respectively, are located adjacent the video drum 5 and a capstan and pinch roller 10 and 11, respectively, are also provided. A plurality of guide rollers 9 which are carried on arms (not shown) are movable within the video unit by pivoting of the arms (not shown) from an inoperative position illustrated in FIG. 4 to an operative position illustrated in FIG. 5. In the inoperative position, the guide rollers 9 are located in the cassette receiving area and are so located that when a video cassette is loaded into the cassette receiving area, the guide rollers 9 are located behind the magnetic video tape of the video cassette. On operation of the video unit the guide rollers 9 are moved into the operative position as illustrated in FIG. 5, and carry the magnetic tape outwardly of the video cassette so that the magnetic tape passes along a magnetic tape path which brings the magnetic tape into engagement with the drum 5 and the sound and erase heads 6 and 7, respectively, as well as the capstan and pinch roller 10 and 11. As mentioned above the construction and operation of such video units will be known to those skilled in the art.

Turning now to the cleaning device 1, the cleaning device 1 comprises a housing 15 of plastics material which is substantially similar to a video tape cassette housing so that the housing 15 is engagable in the cassette receiving area of the video unit to be cleaned. The housing 15 comprises a base 16 and a top wall 17 which are joined by end walls 18 and 19, a front wall 20 and a rear wall 21. The housing 15 defines a hollow interior region 22, within which a pair of spools 24 are rotatably mounted about a pair of spaced apart parallel rotational axes which extend substantially perpendicularly to the base 16. Annular flanges 25 on one axial end of the respective spools 24 engage corresponding openings 26 in the base 16. Leaf springs 27 on the other axial end of the respective spools 24 engage the top wall 17 for urging the spools 24 downwardly towards the base 16 for retaining the flanges 25 in engagement with the openings 26. The spools 24 are rotatable in the housing 15 in similar fashion as the spools of a conventional video tape cassette are rotatably mounted. Additionally, the spacing between the rotational axes of the spools 24 is such that the spools 24 engage corresponding spindles (not shown) in the cassette receiving area of the video player and/or recorder unit for rotating and driving the spools 24 as the spools of a conventional video tape cassette are driven. Lugs 28 extending from the base 16 further facilitate in locating the spools 24 in the housing 15. The housing 15 is of plastics material and is injection moulded in two halves, one half comprising the base 16 and lower portions of the end, front and rear walls 18, 19, 20 and 21, respectively, and the other half comprising the top wall 17 and the remaining portions of the end, front and rear walls 18, 19, 20 and 21, respectively. Posts 29 some of which are illustrated extend between the base 16 and the top wall 17 for securing the two halves of the housing 15 together. This construction of the housing will be well known to those skilled in the art.

A cleaning tape 30 also according to the invention which will be described in detail below is wound onto the spools 24. Thus, as the spools 24 are rotated by the spindles (not shown) of the video unit the cleaning tape 30 is transferred from one spool 24 to the other. A portion of the cleaning tape 30 which extends between the spools 24 is located outside of, and passes across an outer face of the front wall 20 of the housing 15 in an inoperative position, see FIG. 4., in substantially similar fashion as a magnetic video tape would pass across the corresponding front wall of a video cassette housing. In this way, when the cleaning device 1 is loaded into the cassette receiving area of the video unit, the guide rollers 9 engage behind the portion of the cleaning tape 30 which passes across the front wall 20. As the guide rollers 9 are moved from their respective inoperative to their operative positions, the cleaning tape 30 is moved outwardly from the inoperative position to a cleaning position as illustrated in FIG. 5 into cleaning engagement with the components in the magnetic tape path of the video unit to be cleaned.

A retaining means comprising a retaining roller 31 is freely rotatable on a shaft 32 which extends between the base 16 and the top wall 17 for retaining a portion 33 of the cleaning tape 30 spaced apart from the video drum 5 when the cleaning tape 30 is in the cleaning position, see FIG. 5. The cleaning tape 30 passes behind the retaining roller 31, and the retaining roller 31 is located in the housing 15, so that in the cleaning position the cleaning tape engages the drum 5 at two spaced apart arcuate locations 34 and 35. The cleaning tape 30 engages the drum 5 at the locations 34 and 35 over relatively short arcuate distances, for minimising the frictional drag between the cleaning tape 30 and the video drum 5. In this embodiment of the invention the cleaning tape 30 in the cleaning position passes along the magnetic tape path of the video unit with the exception that the portion 33 extends around the retaining roller 31. Thus the cleaning tape 30 engages the video drum 5, sound and erase heads 6 and 7, capstan and pinch rollers 10 and 11 as well as the guide rollers 9 for cleaning thereof.

Openings 36 and 37 are located in the front wall 20 for accommodating the cleaning tape 30 therethrough. Recesses, 38, which are similar to corresponding recesses in a conventional video cassette are provided in the front wall 20 and base 16 for accommodating the guide rollers 9 in the inoperative position behind the cleaning tape 30, when the cleaning tape 30 is in the inoperative position also.

The cleaning tape 30 is adapted by its shape and dimensions, as will be described below, for cleaning the components 4, 5, 6, 7, 9, 10 and 11 of the video unit in an area 40 of the magnetic tape path, and also for cleaning margin areas 41 and 42 of the components 5, 6, 7, 9, 10 and 11 on respective opposite sides of the magnetic tape path areas 40 which lie outside the magnetic tape path area 40 adjacent side edges 44 thereof, see FIGS. 6 to 8. The magnetic tape path area 40 is that area of the component which in normal operation comes into contact with a magnetic tape. The magnetic tape path area 40 of a developed portion of one of the guide rollers 9 is illustrated in FIG. 7, and of a portion of another one of the guide rollers 9 is illustrated in FIGS. 8(a) to (d), as are the margin areas 41 and 42. FIGS. 7 and 8 are not to scale, they are drawn for the purpose of illustrating the cleaning action of the cleaning tape. The margin areas 41 and 42 extend from the side edges 44 of the magnetic tape path area 40 to outer boundaries 45. The width a of the margin areas 41 and 42 between the side edges 44 and the outer boundaries 45 which may be cleaned by the cleaning tape 30 as will be described below depend on the shape and dimensions of the magnetic tape 30.

Referring in particular to FIGS. 6 to 8, the cleaning tape 30 defines a longitudinal central axis 46 which coincides with a centre line of the cleaning tape 30 and extends longitudinally along the cleaning tape 30 in a generally X-axis direction when the cleaning tape 30 is viewed in plan. The longitudinal central axis 46 defines a sinusoidal type waveform which alternates positively and negatively in a Y-axis direction along the X-axis.

The width w of the cleaning tape 30 between opposite side edges 47 and 48 of the cleaning tape 30 when measured perpendicularly to the longitudinal central axis 46 is constant and is similar to the width c of a conventional magnetic video tape, namely, 12.7 mm. The distance d between the peak to peak values of the waveform defined by the longitudinal central axis 46 in the Y-axis direction is 1.5 mm, in other words, the distance d from one positive peak 49 to an adjacent negative peak 50. Accordingly, when the cleaning tape 30 is in the cleaning position and is urged along the magnetic tape path in the direction of the arrow A, see FIGS. 6 and 7, by being wound from one spool 24 onto the other, the cleaning tape 30 cycles progressively from one margin area 41 to the other margin area 42 and back again of each of the components being cleaned. In this way, accumulations of dirt and other foreign matter in the margin areas 41 and 42, as well as any dirt and foreign matter in the magnetic tape path area 40 is removed. In this embodiment of the invention the wavelength s of the longitudinal central axis 46 of the cleaning tape 30 is 120 mm, the wavelength being the distance s from one positive peak 49 of the longitudinal central axis 46 to the next adjacent positive peak 49.

By virtue of the fact that the distance d between the peak to peak values of the waveform defined by the longitudinal axis 46 is 1.5 mm the width a of the respective margin areas 41 and 42 between the side edges 44 and outer boundaries 45 is 0.75 mm. Thus, the total width b of the cleaning path cleaned by the cleaning tape 30 in this embodiment of the invention is 14.2 mm. In other words, the width of the path on each component of the video unit cleaned by the cleaning tape 30 is 14.2 mm. Furthermore, by virtue of the fact that the cleaning tape 30 progressively cycles between the margin areas 41 and 42 as the cleaning tape 30 is urged along the magnetic tape path of the video unit, the side edges 47 and 48 of the cleaning tape 30 move progressively outwardly towards the outer boundaries 45, and thus, the side edges 47 and 48 effectively engage the margin areas 41 and 42 with a scraping shearing type cleaning action for removing accumulated deposits of dirt and other foreign matter from the margin areas 41 and 42 of the components as well as from the magnetic tape path area 40.

Additionally, by virtue of the fact that the respective side edges 47 and 48 of the cleaning tape 30 cycle progressively outwardly towards the outer boundaries 45, it is believed that where the cleaning tape is passing over a roller 9 or the like which is provided with end circumferential flanges 52, as for example, the roller 9 which is illustrated in FIGS. 8(a) to (d), the side edges 47 and 48 of the cleaning tape 30 initially engage internal corners 53 adjacent the flanges 52, thus cleaning the internal corners 53, and then progress outwardly over the flange 52 as can be seen in FIGS. 8(a) to (d). Thus, the relevant areas of the flanges 52 of the rollers 9 are also cleaned.

The cleaning tape 30 in this embodiment of the invention is of flexible polyester material having textured cleaning surfaces 54 and 55 on respective opposite sides of the cleaning tape 30 for engaging the components to be cleaned in the tape path, and also for retaining a cleaning fluid for cleaning the components. A cover 56 similar to a cover on a conventional video cassette is pivotally connected at 57 to the end walls 18 and 19 for protecting the cleaning tape 30 when the device 1 is not in use. The cover 56 is pivoted to clear the cleaning tape 30 when the cleaning device 1 is loaded into the video receiving area of a video unit in similar fashion as the cover of a conventional video cassette is pivoted on being loaded into the cassette receiving area.

In use, the cleaning device 1 is loaded into the cassette receiving area of the video unit, and the play button of the video unit is activated for causing the guide rollers 9 to urge the cleaning tape 30 into the cleaning position as illustrated in FIG. 5. The spindles in the video receiving area rotate the spools 24 for transferring the cleaning tape 30 from one spool 24 onto the other along the magnetic tape path for cleaning the components 4, 5, 6, 7, 9, 10 and 11 therein. As discussed above, as the cleaning tape 30 is drawn along the magnetic tape path, the magnetic tape path area 40 and the margin areas 41 and 42 on opposite sides of the magnetic tape path area 40 of the components are cleaned. If desired, a cleaning fluid may be applied to the cleaning surfaces 54 and 55 of the cleaning tape 30 prior to loading the cleaning device 1 into the cassette receiving area of the video unit.

Referring now to FIGS. 10 to 16 there is illustrated a cleaning device according to another embodiment of the invention, indicated generally by the reference numeral 60 for cleaning components 4, 5, 6, 7, 9, 10 and 11 also of a video recorder and/or playback unit. The cleaning device 60 is somewhat similar to the cleaning device 1 of FIGS. 1 to 9, and where they are similar, similar components are identified by the same reference numerals. The main difference between the video unit 60 and the video unit 1 is in the cleaning tape and the method for causing the cleaning tape to progressively cycle between the margin areas 41 and 42 of the components 5, 6, 7, 9, 10 and 11 to be cleaned. In this embodiment of the invention the cleaning tape is indicated by the reference numeral 61 and is wound onto the spools 24. However, the cleaning tape 61 is a straight tape defining a longitudinally extending central axis 64 which extends in a straight line. The cleaning tape 61 is of material similar to the cleaning tape 30 of the cleaning device 1 and is provided with textured opposite cleaning surfaces 62 and 63 which are similar to the surfaces 54 and 55 of the cleaning tape 30.

Figure 15:
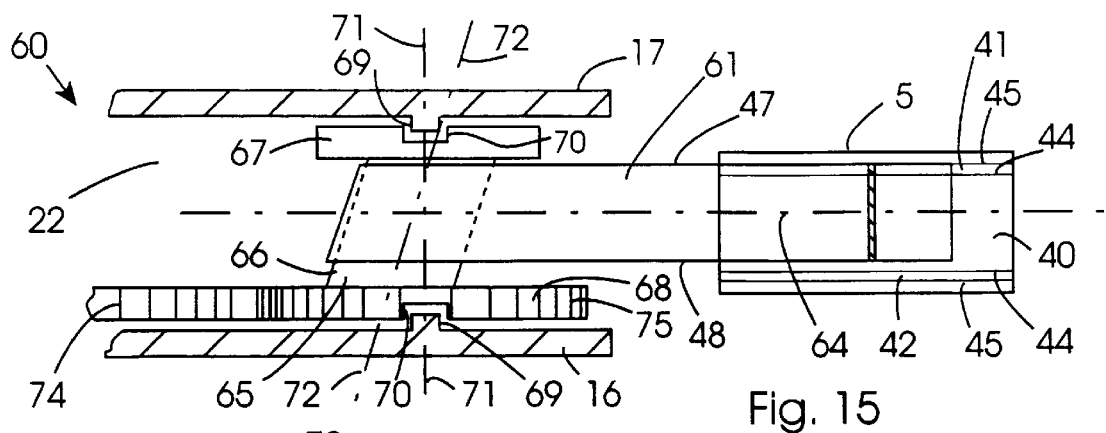
FIG. 15 is an end elevational view of a portion of the cleaning device of FIG. 10 illustrated in use in a video unit, of which a portion is illustrated.
Figure 16:
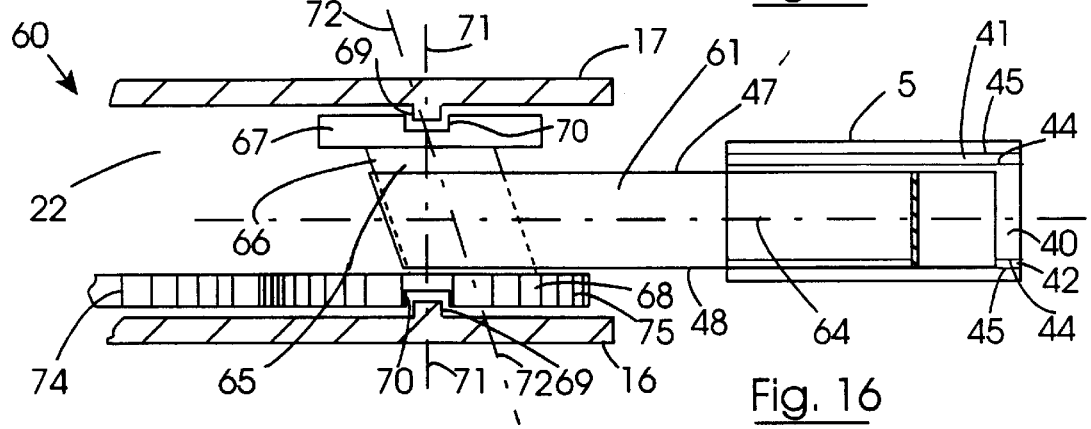
FIG. 16 is an end elevational view similar to FIG. 15 illustrating the portion of the cleaning device in another position in use.

In this embodiment of the invention the retaining means for retaining the portion 33 of the cleaning tape 61 spaced apart from the video drum 5 also acts as a means for moving the cleaning tape 61 in the Y-axis direction for causing the cleaning tape 61 to progressively cycle between the margin areas 41 and 42. Referring in particular to FIGS. 15 and 16, the retaining means comprises a bearing means, which is provided by a bearing member, namely, a retaining roller 65 which is rotatably mounted within the housing 15 between the base 16 and top wall 17. The retaining roller 65 comprises a bearing shaft 66 which extends between an upper flange 67 and a lower flange 68 for engaging the cleaning tape 61. Stub shafts 69 extending from the base 16 and top wall 17 rotatably engage bores 70 in the respective upper and lower flanges 67 and 68. The bores 67 and 68 are concentric with the flanges 67 and 68 so that the retaining roller 65 is rotatable about a rotational axis 71 which extends perpendicularly between the base 16 and the top wall 17 parallel to the Y-axis direction. The bearing shaft 66 defines a bearing axis 72 which is inclined relative to the rotational axis 71 so that as the retaining roller 65 rotates about the rotational axis 71 for each 180° of rotation of the retaining roller 65 the bearing shaft 66 is oriented from an upwardly inclined position towards the video drum 5 as illustrated in FIG. 15 to a downwardly inclined position towards the video drum 5 as illustrated in FIG. 16. This, thus, causes the cleaning tape 61 to move upwardly and downwardly along the bearing shaft 66 for each 360° of rotation of the retaining roller 65, for thereby, causing the cleaning tape 61 to progressively cycle between the outer boundaries 45 of the respective margin areas 41 and 42 of the components to be cleaned, and in particular, of the video drum 5. In this embodiment of the invention as the retaining roller 65 rotates, the bearing axis 72 of the bearing shaft 66 sweeps through a path which defines a pair of diverging cones.

Although the progressive cycling of the cleaning tape 61 between the margin areas 41 and 42 has only been illustrated on the video drum 5 in FIGS. 15 and 16, it will be appreciated that the cleaning tape 61 progressively cycles between corresponding margin areas 41 and 42 on the other components of the video unit. Although, the further the cleaning tape 61 is from the retaining roller 65, the less will be the distance the cleaning tape 61 will move in the Y-axis direction.

A drive transmission means for driving the retaining roller 65 comprises a gear train 73, one of the gears 74 of which is engagable with a ring gear 75 on the lower flange 68. A gear 76 of the gear train 73 is engagable with a ring gear 77 on one of the spools 24 for transmitting drive from one of the spindles (not shown) of the video unit through the gear train 73 to the retaining roller 65. The gear ratio of the gear train 73 is such as to cause the retaining roller 65 to rotate at an appropriate speed for causing the cleaning tape 61 to progressively cycle in the Y-axis direction at a desired rate. Additionally, the angle of inclination of the bearing axis 72 relative to the rotational axis 71 of the retaining roller 65 is such as to be sufficient to cause the cleaning tape 61 to oscillate along the bearing shaft 66 between the flange 67 and the flange 68 as the retaining roller 65 rotates.

Cleaning brushes 78 are mounted in the housing 15 adjacent the opening 37 for cleaning the capstan and pinch roller 10 and 11, respectively. The cleaning tape 61 exits and enters through the opening 37 through the brushes 78.

Figure 14:
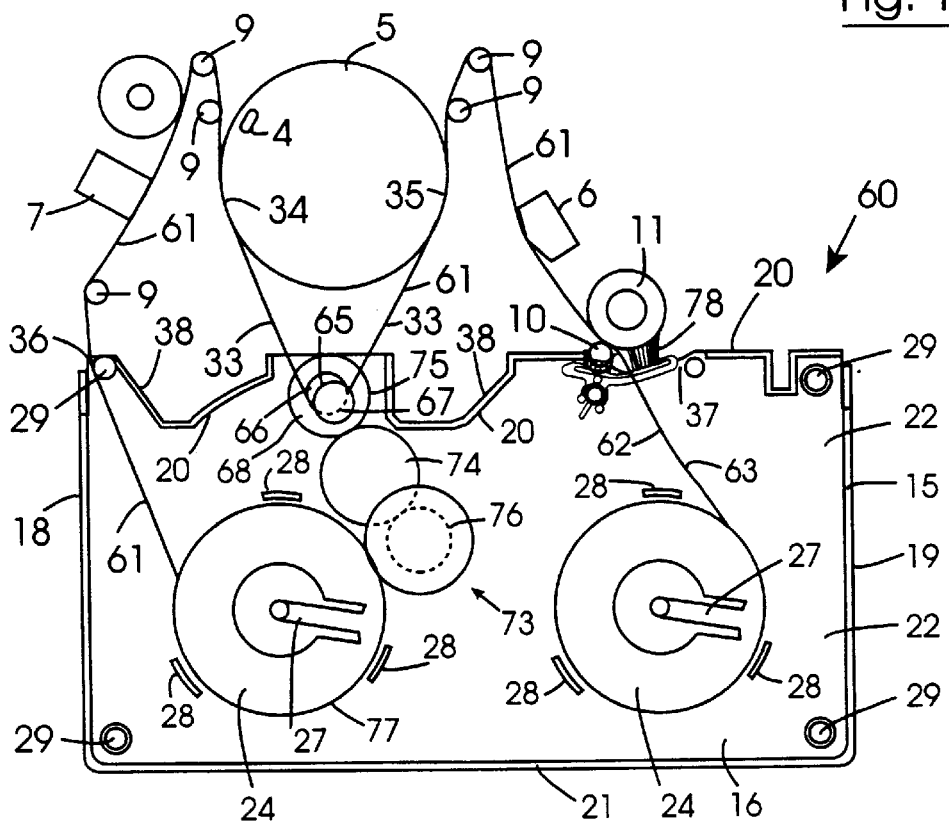
FIG. 14 is a plan view similar to FIG. 13 of the cleaning device of FIG. 10 illustrated in the video unit in a different position in use.

In use, a cleaning liquid may be applied to the cleaning tape 61 as already described with reference to the cleaning device 1. The cleaning device 60 is then loaded into the cassette receiving area of the video unit and the play button of the video unit is activated for causing the guide rollers 9 to urge the cleaning tape 60 into the cleaning position as illustrated in FIG. 14. The spools 24 are rotated by the spindles (not shown) of the video unit for urging the cleaning tape 61 along the magnetic tape path of the video unit for cleaning the components in the magnetic tape path. As the spools 24 urge the cleaning tape 61 through the magnetic tape path, the retaining roller 65 is rotated for causing the cleaning tape to cycle progressively in the Y-axis direction in its own plane for engaging the margin areas 41 and 42 for cleaning thereof, as well as for cleaning the magnetic tape path area 40 of the components of the video unit.

Figure 17:
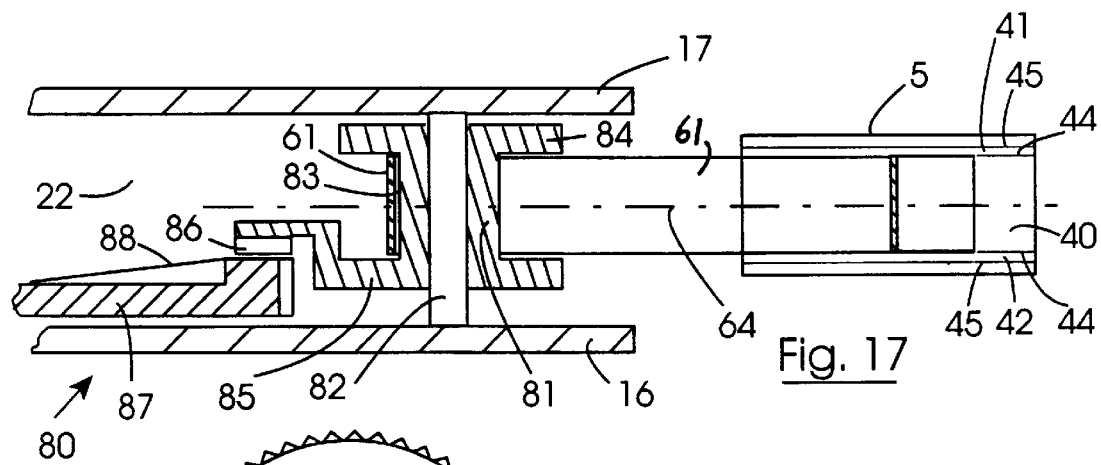
FIG. 17 is an end elevational view similar to FIG. 15 of a portion of a cleaning device according to another embodiment of the invention also illustrated in use in a video unit, of which a portion is illustrated.
Figure 18:
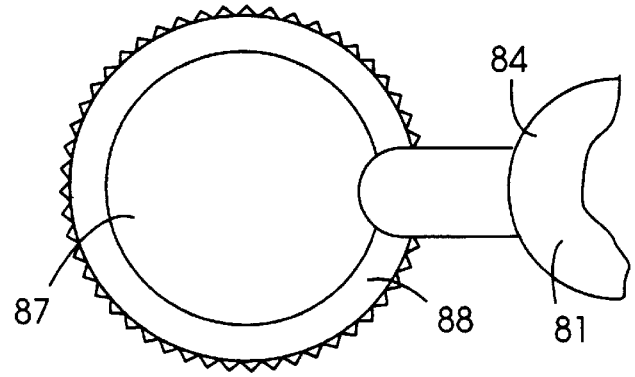
FIG. 18 is a plan view of a detail of the portion of the cleaning device of FIG. 17.
Figure 19:
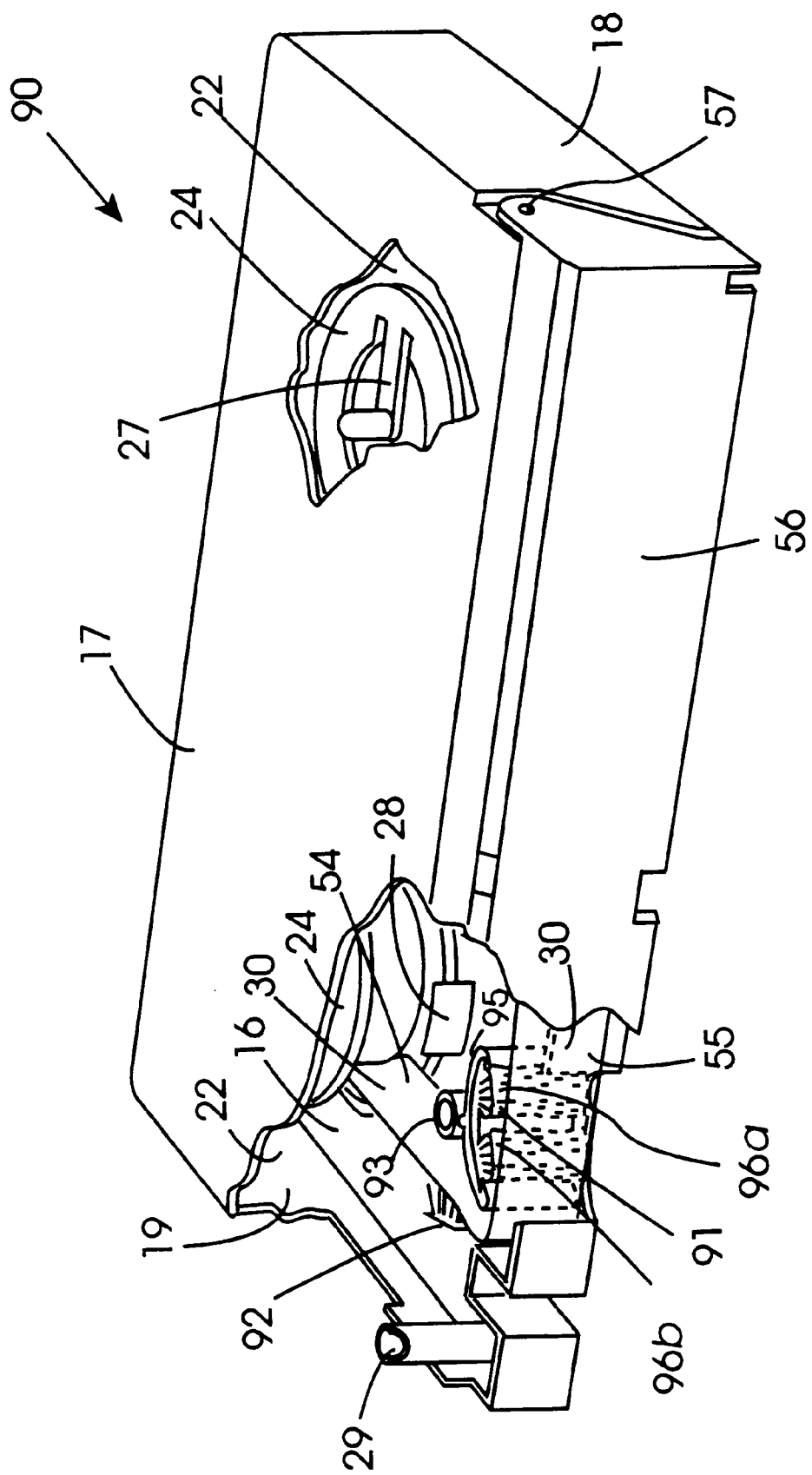
FIG. 19 is a perspective view of a cleaning device according to another embodiment of the invention for cleaning a video recorder and/or playback unit.
Figure 20:
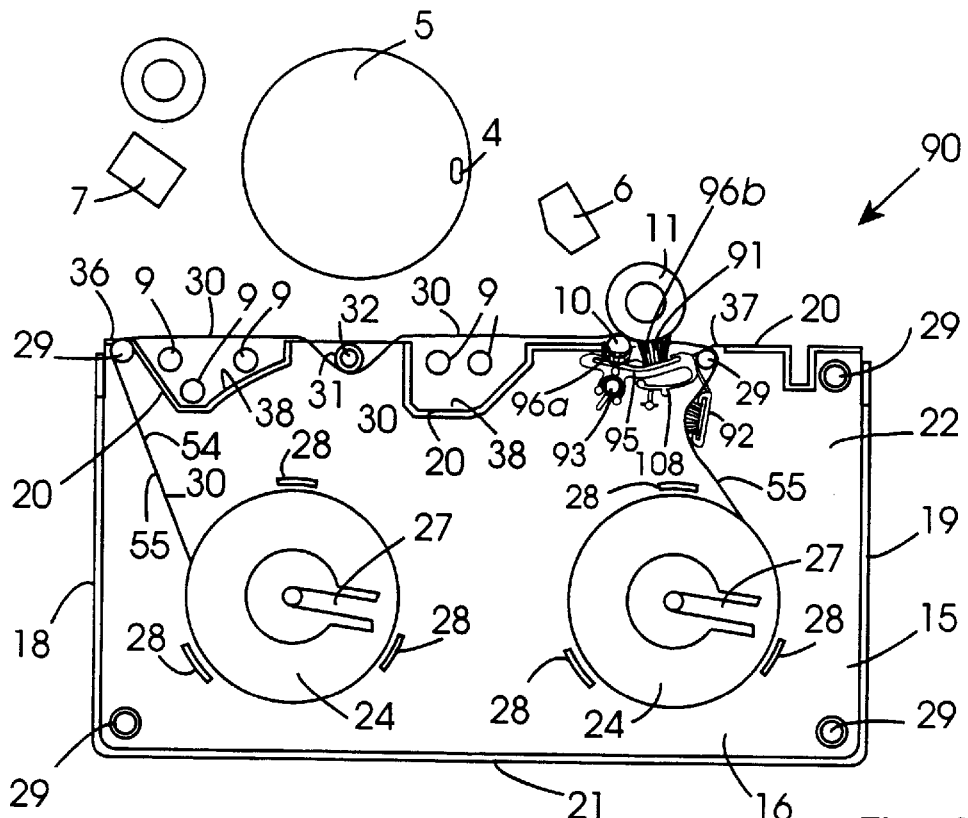
FIG. 20 is a plan view of the cleaning device of FIG. 19 in a video unit.
Figure 21:
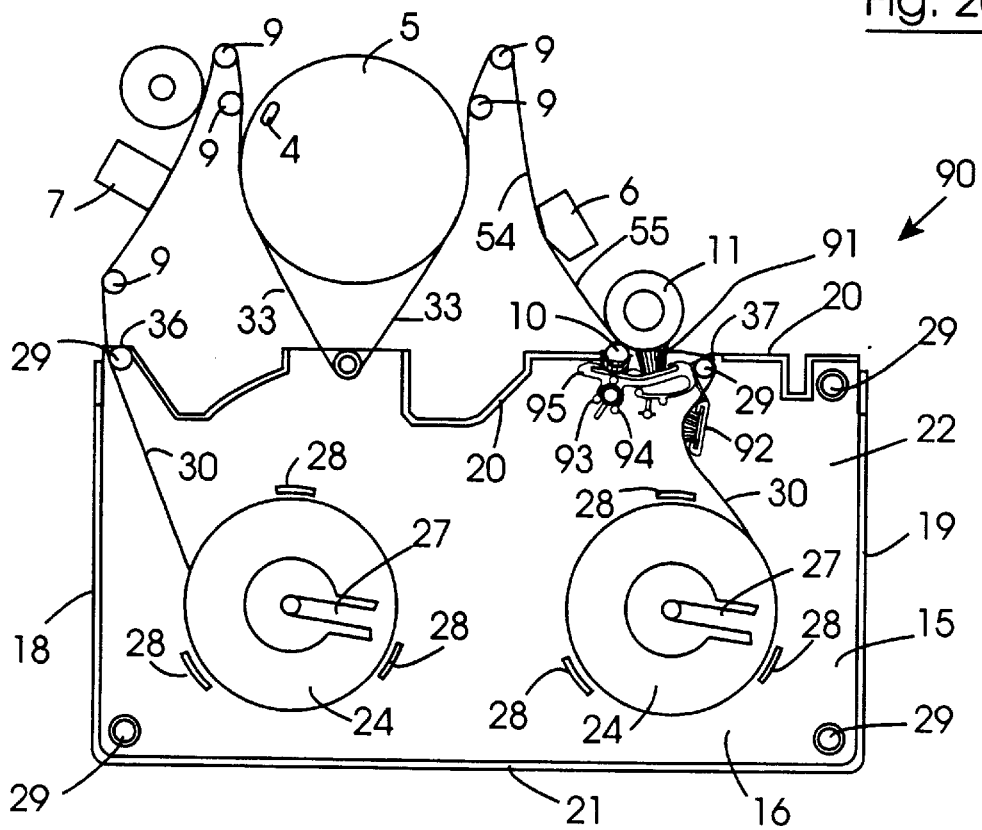
FIG. 21 is a plan view similar to FIG. 20 of the cleaning device of FIG. 19 in the video unit, but in use.
Figure 23:
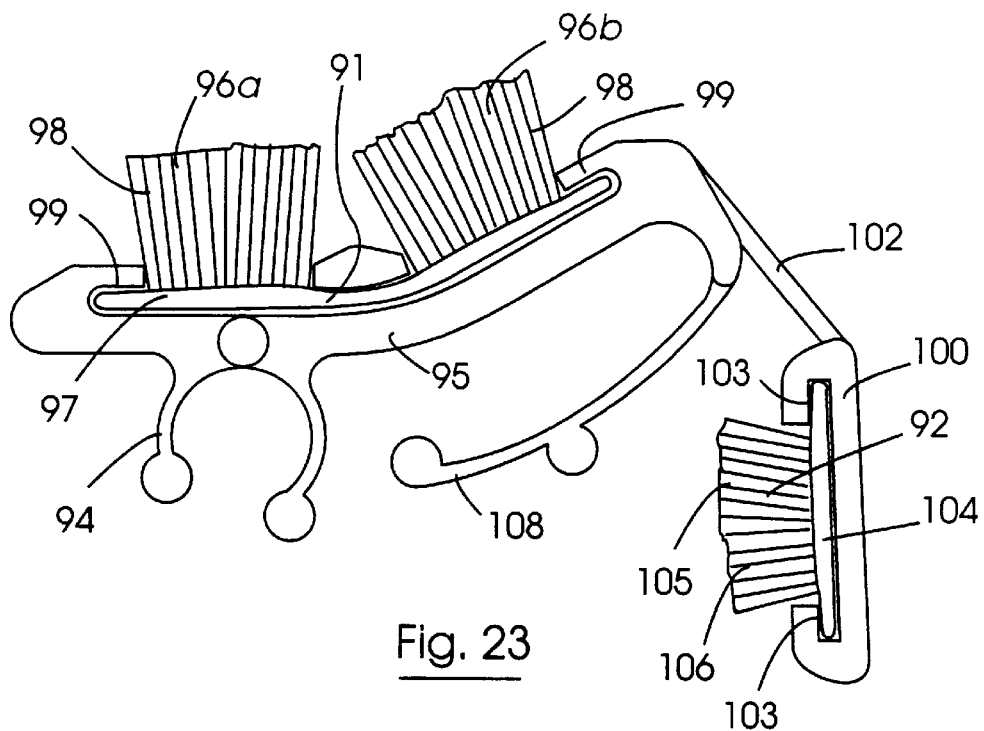
FIG. 23 is a plan view of a detail of the portion of FIG. 22.
Figure 22:
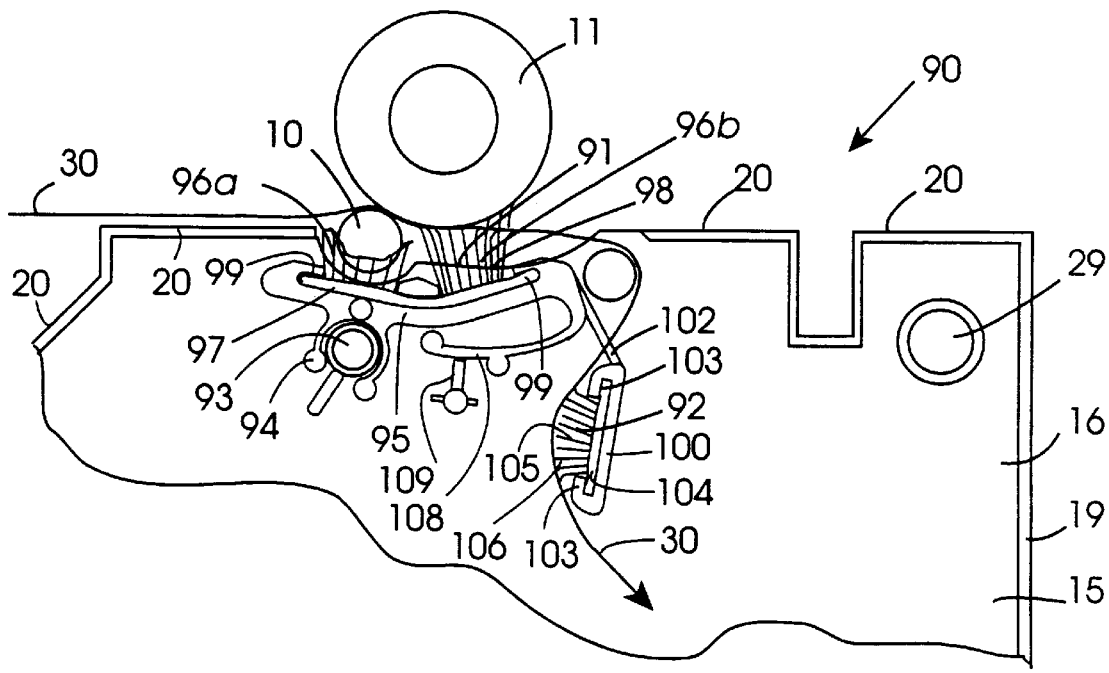
FIG. 22 is a plan view of a portion of the cleaning device of FIG. 19.
Figure 24:
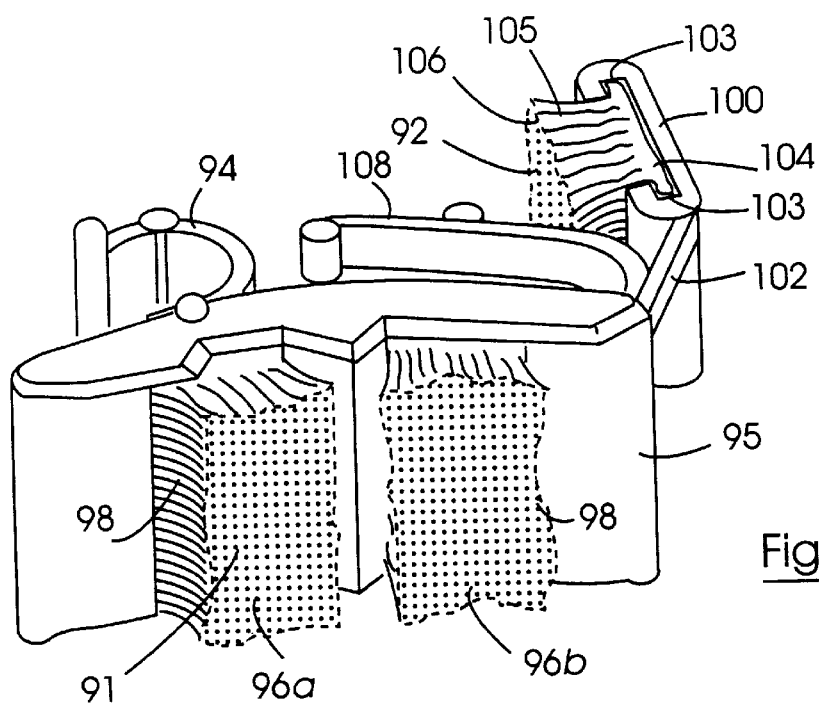
FIG. 24 is a perspective view of the detail of FIG. 23.
Figure 25:
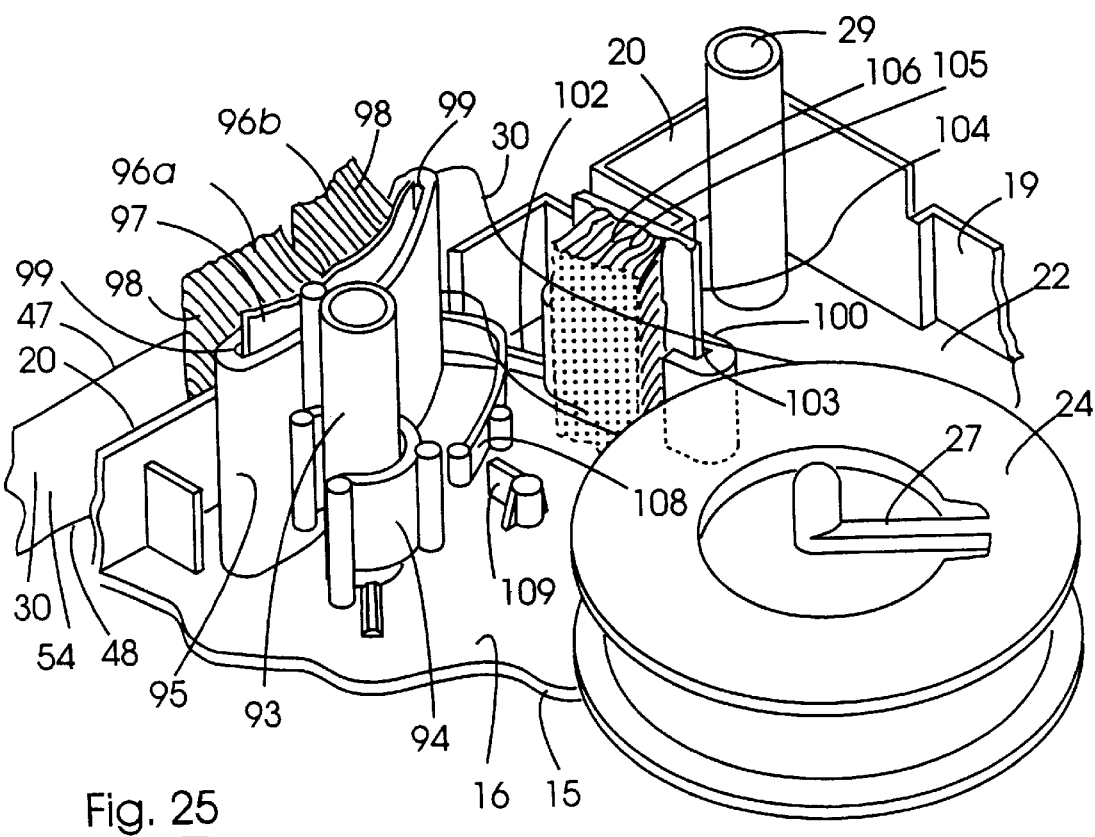
FIG. 25 is a perspective view of the detail of FIG. 22.

Referring now to FIGS. 17 and 18 there is illustrated a portion of a cleaning device according to another embodiment of the invention for cleaning the components 4, 5, 6, 7, 9, 10 and 11 of a video recorder and/or playback unit. The portion of this cleaning device is indicated generally by the reference numeral 80. The cleaning device 80 is substantially similar to the cleaning device 60, and similar components are identified by the same reference numerals. The main difference between the cleaning device 80 and the cleaning device 60 is in the retaining means. In this embodiment of the invention the retaining means comprises a bearing member 81 which retains the portion 33 of the cleaning tape 61 spaced apart from the drum 5, and also acts as the means for moving the cleaning tape 61 in the Y-axis direction in its own plane for causing the cleaning tape 61 to cycle progressively between margin areas 41 and 42 on opposite sides of the magnetic tape path areas 40 of the components of the video unit for cleaning thereof. The bearing member 81 is slidably carried on a shaft 82 which extends perpendicularly between the base 16 and the top wall 17. The bearing member 81 defines a cylindrical bearing surface 83 for engaging the cleaning tape 61. Upper and lower flanges 84 and 85 retain the cleaning tape 61 on the bearing surface 83. A follower 86 extending from the lower flange 85 engages a cam wheel 87 which carries an annular cam 88 which extends around the periphery of the cam wheel 87 for cooperating with the follower 86 for reciprocating the bearing member 81 upwardly and downwardly on the shaft 82. The reciprocating movement of the bearing member 81 on the shaft 82 causes the cleaning tape 61 to cycle progressively in the Y-axis direction in its own plane for in turn cycling between the margin areas 41 and 42 of the components.

A gear train (not shown), but similar to the gear train 73 of the cleaning device 60 drives the cam wheel 87 from one of the spools 24. The ratio of the gear train 73 is such as to rotate the cam wheel 87 for reciprocating the bearing member 81 at an appropriate rate for in turn progressively cycling the cleaning tape 61 in the Y-axis direction at the desired rate as the cleaning tape 61 is being urged along the magnetic tape path in the video unit.

Operation of the cleaning device 80 is similar to that of the cleaning device 60.

Referring now to FIGS. 19 to 25 there is illustrated a cleaning device indicated generally by the reference numeral 90 according to another embodiment of the invention for cleaning the components 4, 5, 6, 7, 9, 10 and 11 of a video recorder and/or playback unit. The cleaning device 90 is substantially similar to the cleaning device 1 and similar components are identified by the same reference numerals. The main difference between the cleaning device 90 and the cleaning device 1 of FIGS. 1 to 9 is that the cleaning device 90 comprises a capstan and pinch roller cleaning means, namely, a capstan and pinch roller cleaning brush 91 which is mounted in the housing 15 for engaging and cleaning the capstan and pinch rollers 10 and 11, respectively, and a tape cleaning means, namely, a tape cleaning brush 92 is also provided in the housing 15 for cleaning the cleaning tape 30 as it enters or exits the housing 15, depending on the direction of rotation of the spools 24.

The capstan and pinch roller cleaning brush 91 is pivotally carried on a pivot post 93 which extends between the base 16 and the top wall 17 of the housing 15 for accommodating pivotal movement of the cleaning brush 91 for good cleaning engagement with the capstan 10 and pinch roller 11. A resilient mounting bracket 94 extending from the cleaning brush 91 pivotally and releasably engages the post 93. The cleaning brush 91 comprises a main carrier housing 95 of plastics material which carries a brush member 96. The brush member 96 comprises a relatively rigid woven base 97 from which a plurality of bristles 98 extend and are woven into the base 97. The woven base 97 is of a semi-rigid type material and is slidably engaged in the main carrier housing 95 between a pair of side tracks 99, for facilitating ease of replacement of the brush member 96. The mounting bracket 94 is integrally injection moulded with the main carrier housing 95. The brush member 96 comprises two portions, namely, 96*a* and 96*b*. The portion 96*a* cleans the capstan 10 and the portion 96*b* cleans the pinch roller 11. However, since in use, as will be described below, the cleaning tape 30 passes between the capstan 10 and pinch roller 11, and around an arcuate portion of the pinch roller 11, the portion 96*b* of the brush member 96, as well as cleaning the areas of the pinch roller 11 on either side of the cleaning tape 30, also cleans the cleaning surface 54 of the cleaning tape 30. Thus, the portion 96*b* of the brush member 96 acts as part of the tape cleaning means for cleaning the cleaning tape 30 so that the cleaning tape 30 may be used many times, in other words, may be wound backwards and forwards between the spools 24 to make many cleaning passes.

The tape cleaning brush 92 is carried on the main carrier housing 95 of the capstan and pinch roller cleaning brush 91, and cleans the cleaning surface 55 of the cleaning tape 30. The cleaning brush 92 comprises a secondary carrier housing 100 which is carried on the main carrier housing 95 by a carrier member 102 which extends from the main carrier housing 95. The main carrier housing 95, the secondary carrier housing 100 and the carrier member 102 are integrally injection moulded. The carrier member 102 is of dimensions to be relatively resilient for facilitating resilient movement between the secondary carrier housing 100 and the main carrier housing 95 so that the cleaning brush 92 is lightly urged into cleaning engagement with the surface 55 of the cleaning tape 30. Side tracks 103 on the secondary carrier housing 100 slidably engage a relatively rigid woven base 104 of a brush member 105 of the tape cleaning brush 92 for carrying the brush member 105 in the secondary carrier housing 100. Bristles 106 of the brush member 105 extend from, and are woven into the woven base 104.

The mounting bracket 94 is releasably engageable with the post 93 for facilitating removal of the main carrier housing 95 through the opening 37 in the front wall 20 for replacement of the brush members 96 and 105, of the capstan and pinch roller cleaning brush 91 and the tape cleaning brush 92, respectively. The brush members 96 and 105 may be replaced with new brush members 96 and 105 by sliding the brush member 105 in and out of the tracks 103. Additionally, the brush members 96 and 105 may be removed for cleaning, for example, by rinsing in water or the like. In this way, any accumulations of dirt on the brush members 96 and 105 which would have been collected from the cleaning tape 30 are removed. To remove the brush members 96 and 105, the assembly of the capstan and pinch roller cleaning brush 91 and the tape cleaning brush 92 is removed by unclipping the resilient mounting bracket 94 from the pivot post 93, and withdrawing the assembly from the hollow interior region 22 of the housing 15.

A resilient urging member 108 is integrally injection moulded with the main carrier housing 101, and engages a projection 109 extending upwardly from the base 16 for resiliently urging the capstan and pinch roller cleaning brush 91 into engagement with the capstan 10 and pinch roller 11.

Operation of the cleaning device 90 is substantially similar to the cleaning device 1 with the addition that as well as the cleaning tape 30 cleaning the magnetic tape path areas 40 and the margin areas 41 and 42 of the components 5, 6, 7, 9, 10 and 11, the capstan and pinch roller cleaning brush 91 also cleans the magnetic tape path area 40 on the capstan and pinch roller 10 and 11 and the margin portions 41 and 42 as well. Additionally, the tape cleaning brush 92 cleans the surface 55 of the cleaning tape 30 and the cleaning brush 96*b* cleans the surface 54 of the cleaning tape 30 as the cleaning tape 30 enters or exits the hollow interior region 22 of the housing 15, depending on the direction of rotation of the spools 24.

Prior to inserting the cleaning device 90 in the cassette receiving area of the video unit, cleaning liquid may be applied to the surface 54 and 55 of the cleaning tape 30, and may also be applied to the capstan and pinch roller cleaning brush 91 and the tape cleaning brush 92.

By virtue of the fact that the capstan and pinch roller cleaning brush 91 and the tape cleaning brush 92 clean the respective surfaces 54 and 55 of the cleaning tape 30, any dust, dirt and other debris and foreign matter removed from the components of the video unit is removed by the brushes 91 and 92 from the cleaning tape 30. This, thus, permits the cleaning tape to be reused many times. Additionally in the event that cleaning liquid is only applied to the cleaning tape 30 of the cleaning device 90, the cleaning liquid is transferred from the cleaning tape 30 to the cleaning brushes 91 and 92 for further enhancing the cleaning action of the respective brushes 91 and 92 both for cleaning the capstan and pinch rollers 10 and 11 and the cleaning tape 30.

The advantages of the cleaning device 90 are many. As well as cleaning the margin areas on opposite sides of the magnetic tape path area of the components of the video unit, the cleaning device 90 also thoroughly cleans the capstan and pinch rollers by the cleaning action of the capstan and pinch roller cleaning brush 91. Additionally, by virtue of the fact that the cleaning surfaces of the cleaning tape are cleaned by the brushes 91 and 92 the cleaning tape may be reused many times by winding the cleaning tape backwards and forwards between the spools 24, thereby significantly increasing the life of the cleaning device. Furthermore, by virtue of the fact that the cleaning brushes 91 and 92 are removable and replaceable, the cleaning brushes 91 and 92 may be removed for cleaning or replaced with new cleaning brushes, thereby further extending the life of the cleaning device. Additionally, by virtue of the fact that the tape cleaning brush 92 is resiliently mounted for providing light cleaning engagement between the cleaning brush 92 and the cleaning tape 30, frictional resistance between the cleaning brush 92 and the cleaning tape 30 is minimised, thereby avoiding any danger of overloading the drive mechanism of the video unit.

While the cleaning device 90 which has been described with reference to FIGS. 19 to 25 has been described as comprising a cleaning tape 30 similar to that provided in the cleaning device 1 of FIGS. 1 to 9, it is envisaged that the cleaning device 90 may be provided with a normal straight cleaning tape of the type described in the cleaning device 60 which is described with reference to FIGS. 10 to 16, and where the cleaning device 90 is provided with such a straight cleaning tape, the cleaning device 90 may be provided with a means for moving the cleaning tape in the Y-axis direction such as, for example, the means for moving the cleaning tape 61 in the device 60 which is described with reference to FIGS. 10 to 16 and FIG. 17 and 18, or the cleaning device 90 may be provided without any means for moving the cleaning tape, in such a case, the cleaning device 90 would clean only the magnetic tape path areas of the component.

While the cleaning tape of the cleaning devices has been described as being of polyester material with textured surfaces, any other suitable cleaning tape may be provided, and while it is desirable it is not essential to provide the cleaning tape with a textured surface. Additionally, while the capstan and pinch roller cleaning means and the tape cleaning means have been described as being provided by brushes in the cleaning device of FIGS. 19 to 25, other suitable cleaning means may be provided, for example, the cleaning means may be of felt. Additionally, while the tape cleaning brush has been described in the cleaning device of FIGS. 19 to 25 as being resiliently mounted, while this is preferable, it is not essential.

While the cleaning tape of the cleaning devices described with reference to FIGS. 1 to 9 and FIGS. 19 to 25 has been described as being both shaped and dimensioned for cleaning the margin areas of the components of the video unit on opposite sides of the magnetic tape path area, it is envisaged that in certain cases, the cleaning tape may be dimensioned only to achieve cleaning of the margin areas. For example, the cleaning tape may be of width greater than that of a conventional magnetic video tape so that the extra width of the cleaning tape would facilitate cleaning of the margin areas. It will also be appreciated that while the cleaning tape has been shaped in the form of a substantially sinusoidal waveform, the cleaning tape may be of any other suitable shape, for example, in certain cases, it is envisaged that the waveform defined by the longitudinal central axis of the cleaning tape may be a stepped waveform, and where the longitudinal central axis defines a curved waveform, the wavelength of the waveform, in other words, the distance along the X-axis from one positive peak to the next positive peak of the waveform defined by the longitudinal central axis may be greater or shorter than that described, and in other cases, the distance from a positive peak to an adjacent negative peak of the longitudinal central axis in the direction of the Y-axis may also be different to that described, and as discussed, the distance from peak to peak in the direction of the Y-axis, will in general, be dependent on the transverse width of the cleaning tape. It is also envisaged that the cleaning tape of all the embodiments of the invention described may be narrower than a conventional magnetic video tape, and in which case, the peak to peak distance in the Y-axis direction of the cleaning tape from positive peak to negative peak would be relatively large.

Furthermore, it will be appreciated that the wavelength of the cleaning tape may vary along the length of the cleaning tape in the X-axis direction, and additionally, the peak to peak distance in the Y-axis direction of the longitudinal central axis, namely, the distance in the Y-axis direction from a positive peak to an adjacent negative peak may also vary along the length of the cleaning tape in the direction of the X-axis. Indeed, it is envisaged that the cleaning tape may be provided with sequentially arranged alternate lengths of cleaning tape, some of which may define a longitudinal central axis which extends in a straight line, and others of which define a longitudinal central axis which defines a sinusoidal or other alternating waveform.

It is also envisaged that the cleaning tape may be shaped to engage the respective margin areas on the opposite sides of the magnetic tape path simultaneously, and in such a case, the cleaning tape may be shaped to intermittently and progressively engage the respective margin areas simultaneously.

It will also be appreciated that the cleaning devices described with reference to FIGS. 10 to 18 may be provided with a cleaning tape of which part or all is similar to the cleaning tape 30 having a longitudinal central axis which defines a substantially sinusoidal waveform. In which case, it is envisaged that the position of the tape relative to the retaining rollers will be such that the action of the retaining rollers for causing the cleaning tape to cycle progressively in the Y-axis direction will cooperate to maximise the amplitude of the cycling of the cleaning tape in the Y-axis direction.

While the cleaning devices have been described as comprising a housing which is substantially similar to a housing of a conventional video tape cassette, the housing may be of any other suitable shape or construction. Additionally, while it is advantageous, it is not essential that the cleaning tape be wound onto a pair of spools which are engagable with spindles in the cassette receiving area. Other suitable means for urging the cleaning tape along the magnetic tape path of the video unit may be provided.

It is also envisaged that the cleaning tape according to the invention may be provided on its own without a housing, and in certain cases, the cleaning tape may be provided on a spool only or on two spools. In such cases, the cleaning tape would be suitable for cleaning a recorder and/or playback unit of the type commonly referred to as a spool to spool unit, in other words, a recorder and/or playback unit of the type which does not require the magnetic tape to be provided in a cassette housing, but rather, carried on a spool only. Additionally, the cleaning tape may be carried on a spool which would be located in a housing which carried only that spool.

Additionally, it is envisaged that the cleaning devices and cleaning tapes according to the invention may be used for cleaning a component in a tape path of a unit other than a recorder and/or playback unit, for example, a machine unit in which a tape passes along and defines a tape path, and engages at least one component. In which case, the cleaning tape may be supplied on a spool or in a cassette type housing, and the cassette type housing may be of any suitable shape for fitting into the machine unit. Needless to say, the cleaning device according to the invention could be appropriately adapted to suit any such machine unit.

It will also be appreciated that while it is preferable, it is not essential to provide a retaining means for retaining a portion of the cleaning tape spaced apart from the video drum, and where a retaining means is not provided, it will be appreciated that the means for moving the cleaning tape in its own plane in the Y-axis direction may be located in any other suitable part of the housing, for example, at an exit point or entry point of the cleaning tape into or out of the housing. Indeed, in certain cases, it is envisaged that the spools onto which the cleaning tape is wound may act as the means for causing the cleaning tape to cycle in its own plane in the Y-axis direction. This could be achieved by reciprocating the spools along their rotational axes, and a suitable means for causing the spools to so reciprocate would be provided.

While the cleaning devices have been described for cleaning the components in the tape path of a video recorder and/or playback unit, the cleaning device may be used for cleaning any other recorder and/or playback unit, for example, an audio tape recorder and/or playback unit. Additionally, it will be appreciated that while the cleaning devices have been described for cleaning all the components in the magnetic tape path of a video unit, in certain cases, the cleaning tape may be arranged to clean only some of the components in the magnetic tape path.

We claim:

1. A cleaning device for cleaning at least one component in a tape path in a machine unit in which a tape passes along and defines the tape path and engages the at least one component, the tape path extending in a general X-axis direction, the cleaning device comprising a cleaning tape (30,61) for placing in the tape path for engaging the at least one component in an area (40) coinciding with the tape path for cleaning the tape path area (40) of the component as the cleaning tape (30,61) is being urged along the tape path in the X-axis direction, and for intermittently and alternately engaging respective margin areas (41,42) of the at least one component outside the tape path area (40) in a Y-axis direction adjacent respective opposite side edges (44) of the tape path for intermittently and alternately cleaning the margin areas (41,42).

2. A cleaning device as claimed in claim 1 in which the cleaning tape (30,61) progressively engages each margin area (41,42).

3. A cleaning device as claimed in claim 1 in which the cleaning tape (30,61) defines a pair of opposite longitudinally extending side edges (41,48) which extends in a generally X-axis direction relative to the tape path for progressively engaging the respective corresponding margin areas (41,42) for cleaning the margin areas (41,42) with a shearing type cleaning action.

4. A cleaning device as claimed in claim 1 in which the cleaning tape (30,61) cycles between the respective margin areas (41,42).

5. A cleaning device as claimed in claim 1 in which the cleaning tape (30) is shaped and dimensioned so that as the cleaning tape (30) is being urged along the tape path the respective margin areas (41,42) are engaged by the cleaning tape (30).

6. A cleaning device as claimed in claim 5 in which the cleaning tape (30) when viewed in plan defines a longitudinally extending central axis (46), which extends in a generally X-axis direction, and in use extends in the general direction of the tape path, the longitudinal central axis (46) of the cleaning tape (30) defining a waveform which alternates in a Y-axis direction positively and negatively about the X-axis.

7. A cleaning device as claimed in claim 6 in which the longitudinal central axis (46) of the cleaning tape (30) alternates progressively in the Y-axis direction about the X-axis.

8. A cleaning device as claimed in claim 6 in which the longitudinal central axis (46) of the cleaning tape (30) defines a sinusoidal type waveform.

9. A cleaning device as claimed in claim 6 in which the transverse width of the cleaning tape (30) perpendicular to the longitudinal central axis (46) is substantially constant, and the peak (49) to peak (50) value of the waveform defined by the longitudinal central axis (46) of the cleaning tape (30) in the Y-axis direction is such that the cleaning tape (30) progressively and sequentially engages the respective margin areas (41,42) of each component being cleaned.

10. A cleaning device as claimed in claim 6 in which the transverse width of the cleaning tape (30) perpendicular to the longitudinal central axis (46) of the cleaning tape (30) is substantially similar to the width of the tape path.

11. A cleaning device as claimed in claim 1 in which the cleaning tape (30,61) comprises a flexible tape having at least one cleaning surface on one face of the cleaning tape.

12. A cleaning device as claimed in claim 1 in which a tape cleaning means (91,92) is provided for cooperating with the cleaning tape (30,61) for cleaning the cleaning tape (30,61) 50 that the cleaning tape (30,61) may be used more than once.

13. A cleaning device as claimed in claim 1 in which the cleaning device further comprises a cassette type housing (15), which is adapted for engaging in a cassette receiving area of the machine unit, the cleaning tape (30,61) being located in the housing (15) and a portion of the cleaning tape (30,61) being exposed for cleaning the at least one component, and a means (24) for urging the cleaning tape along the tape path in the X-axis direction is provided in the housing (15) for cooperating with a drive means in the machine unit for urging the cleaning tape (30,61) along the tape path.

14. A cleaning device as claimed in claim 13 in which a means for moving the cleaning tape (61) in the Y-axis direction for engaging the respective margin areas (41,42) is located in the housing (15).

15. A cleaning device for cleaning at least one component in a magnetic tape path of a recorder and/or playback unit, the magnetic tape path extending longitudinally in the unit in a general X-axis direction, the cleaning device comprising:

a housing (15) for engaging in a receiving area of the recorder and/or playback unit, and a cleaning tape (30,61) being located in the housing (15), a portion of the cleaning tape (30,61) being exposed for engaging the at least one component in an area (40) coinciding with the tape path for cleaning the at least one component in the tape path area (40), as the cleaning tape (30,61) is being urged along the tape path in the X-axis direction, and for intermittently and alternately engaging respective margin areas (41,42) of the at least one component outside the magnetic tape path area (40) in a Y-axis direction adjacent respective opposite side edges (44) of the tape path for intermittently and alternately cleaning the margin areas (41,42).

16. A cleaning device as claimed in claim 15 in which the cleaning tape (30,61) progressively engages each margin area (41,42).

17. A cleaning device as claimed in claim 15 in which the cleaning tape (30,61) defines a pair of opposite longitudinally extending side edge (47,48) which extends in a generally X-axis direction relative to the tape path for progressively engaging the respective corresponding margin areas (41,42) for cleaning the margin areas (41,42) with a shearing type cleaning action.

18. A cleaning device as claimed in claim 15 in which the cleaning tape (30,61) cycles between the respective margin areas (41,42).

19. A cleaning device as claimed in claim 15 in which the cleaning tape (30) is shaped and dimensioned so that as the cleaning tape (30) is being urged along the tape path the respective margin areas (41,42) are engaged by the cleaning tape (30).

20. A cleaning device as claimed in claim 19 in which the cleaning tape (30) when viewed in plan defines a longitudinally extending central axis (46), which extends in a generally X-axis direction, and in use extends in the general direction of the tape path, the longitudinal central axis (46) of the cleaning tape (30) defining a waveform which alternates in a Y-axis direction positively and negatively about the X-axis.

21. A cleaning device as claimed in claim 20 in which the longitudinal central axis (46) of the cleaning tape (30) alternates progressively in the Y-axis direction about the X-axis.

22. A cleaning device as claimed in claim 20 in which the longitudinal central axis (46) of the cleaning tape (30) defines a sinusoidal type waveform.

23. A cleaning device as claimed in claim 20 in which the transverse width of the cleaning tape (30) perpendicular to the longitudinal central axis (46) is substantially constant, and the peak (49) to peak (50) value of the waveform defined by the longitudinal central axis (46) of the cleaning tape (30) in the Y-axis direction is such that the cleaning tape (30) progressively and sequentially engages the respective margin areas (41,42) of each component being cleaned.

24. A cleaning device as claimed in claim 20 in which the transverse width of the cleaning tape (30) perpendicular to the longitudinal central axis (46) of the cleaning tape (30) is substantially similar to the width of the tape path.

25. A cleaning device as claimed in claim 15 in which the cleaning tape (30,61) comprises a flexible tape having at least one cleaning surface on one face of the cleaning tape.

26. A cleaning device as claimed in claim 15 in which a tape cleaning means (91,92) is provided in the housing (15) for cooperating with the cleaning tape (30,61) for cleaning the cleaning tape (30,61) 50 that the cleaning tape (30,61) may be used more than once.

27. A cleaning device as claimed in claim 15 in which the housing (15) is a cassette type housing, which is adapted for engaging in a cassette receiving area of the recorder and/or playback unit.

28. A cleaning device as claimed in claim 15 in which a means (24) for urging the cleaning tape along the tape path in the X-axis direction is provided in the housing.

29. A cleaning device as claimed in claim 28 in which the means (24) for urging the cleaning tape (30,61) along the tape path is cooperable with a drive means in the recorder and/or playback unit for urging the cleaning tape (30,61) along the tape path.

30. A cleaning device as claimed in claim 15 in which a means (65,81) for moving the cleaning tape (61) in the Y-axis direction for engaging the respective margin area (41,42) is located in the housing.

31. A cleaning device as claimed in claim 30 in which the means (65,81) for moving the cleaning tape (61) in the Y-axis direction comprises a bearing means (65,81) engagable with the cleaning tape (61) the bearing means (66,83) being moveable for moving the cleaning tape (61) in the Y-axis direction.

32. A cleaning device as claimed in claim 31 in which the bearing means (66,83) comprises a roller (65) which defines the bearing surface (66) for engaging the cleaning tape, the roller (65) being rotatably mounted in the housing (15) about a rotational axis (71) which is parallel to the Y-axis direction, the bearing axis (72) being inclined to the rotational axis (71) of the roller (65) for causing the cleaning tape (61) to oscillate along the bearing surface (66) of the roller (65) in a generally Y-axis direction as the roller (65) rotates about its rotational axis (71).

33. A cleaning device as claimed in claim 31 in which the bearing axis (72) extends parallel to the Y-axis, the bearing means (81,83) being moveable longitudinally along the bearing axis (72) for moving the cleaning tape (61) in the Y-axis direction.

34. A cleaning device as claimed in claim 31 in which a drive transmission means (73) is cooperable with the bearing means (65,81) for moving or rotating the bearing means (65,81) for in turn moving the cleaning tape (61) in the Y-axis direction, the drive transmission means (73) being cooperable with the recorder and/or playback unit for receiving drive therefrom.

35. A cleaning device as claimed in claim 15 in which the exposed portion (33) of the cleaning tape (30,61) is located externally of the housing (15) and is engagable with a guide means of the recorder and/or playback unit and is moveable by the guide means from an inoperative position adjacent the housing (15) to a cleaning position engaging the components to be cleaned in the magnetic tape path.

36. A cleaning device as claimed in claim 35 in which the cleaning device is for cleaning components in a video recorder and/or playback unit, the cleaning tape (30,61) being engagable with the video drum when the cleaning tape (30,61) is in the cleaning position.

37. A cleaning device as claimed in claim 36 in which a retaining means (31,65,81) is provided for retaining a portion (33) of the cleaning tape (30,61) spaced apart from a video drum of the video unit when the cleaning tape (30,61) is in the cleaning position, so that the cleaning tape (30,61) in the cleaning position contacts the video drum (5) in at least one location (34,35) which is of arcuate length shorter than the arcuate length of normal contact of a magnetic tape with the video drum.

38. A cleaning device as claimed in claim 37 in which the retaining means (31,65,81) is provided by the bearing means (65,81).

39. A method for cleaning at least one component in a tape path in a machine unit in which a tape passes along and defines the tape path and engages the at least one component, the tape path extending in a general X-axis direction, the method comprising placing a cleaning tape (30,61) in the tape path for engaging the at least one component in an area (40) coinciding with the tape path, urging the cleaning tape along the tape path in the X-axis direction for cleaning the tape path area of the at least one component and for intermittently and alternately engaging respective margin areas (41,42) of the at least one component outside the tape path area (40) in a Y-axis direction adjacent respective opposite side edges (44) of the tape path (40) for intermittently and alternately cleaning the margin areas (41,42).

40. A method as claimed in claim 39 in which the cleaning tape (30,61) progressively engages each margin area (41, 42).

41. A method as claimed in claim 39 in which the cleaning tape (30,61) defines a pair of opposite longitudinally extending side edges, the side edges progressively engaging the respective corresponding margin areas (41,42) with a shearing type cleaning action.

42. A method for cleaning at least one component in a magnetic tape path in a recorder and/or playback unit in which a magnetic tape passes along and defines the tape path and engages the at least one component, the tape path extending in a general X-axis direction, the method comprising placing a cleaning tape (30,61) in the tape path for engaging the at least one component in an area (40) coinciding with the tape path, urging the cleaning tape along the tape path in the X-axis direction for cleaning the tape path area of the at least one component and for intermittently and alternately engaging respective margin areas (41,42) of the at least one component outside the tape path area (40) in a Y-axis direction adjacent respective opposite side edges (44) of the tape path (40) for intermittently and alternately cleaning the margin areas (41,42).

43. A method as claimed in claim 42 in which the cleaning tape (30,61) progressively engages each margin area (41, 42).

44. A method as claimed in claim 42 in which the cleaning tape (30,61) defines a pair of opposite longitudinally extending side edges, the side edges progressively engaging the respective corresponding margin areas (41,42) with a shearing type cleaning action.

* * * * *